US011672011B2

(12) United States Patent
Chisci et al.

(10) Patent No.: US 11,672,011 B2
(45) Date of Patent: Jun. 6, 2023

(54) ELIGIBLE TRANSMISSION BEAMS BASED ON DIRECTIONAL LISTEN-BEFORE-TALK

(71) Applicant: QUALCOMM Incorporated, San Diego, CA (US)

(72) Inventors: Giovanni Chisci, San Diego, CA (US); Jing Sun, San Diego, CA (US); Arumugam Chendamarai Kannan, San Diego, CA (US); Vinay Chande, San Diego, CA (US); Aleksandar Damnjanovic, Del Mar, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/221,521

(22) Filed: Apr. 2, 2021

(65) Prior Publication Data

US 2022/0322435 A1 Oct. 6, 2022

(51) Int. Cl.
*H04W 74/08* (2009.01)
*H04W 16/28* (2009.01)

(52) U.S. Cl.
CPC ....... *H04W 74/0816* (2013.01); *H04W 16/28* (2013.01)

(58) Field of Classification Search
CPC .......................... H04W 74/0816; H04W 16/28
See application file for complete search history.

(56) References Cited

U.S. PATENT DOCUMENTS

2018/0115996 A1* 4/2018 Si ...................... H04W 74/0816
2018/0352577 A1* 12/2018 Zhang ............... H04W 74/0816
2019/0200389 A1* 6/2019 Li ........................ H04B 7/0695
2019/0342037 A1* 11/2019 Karaki .................... H04L 1/188
2019/0373635 A1* 12/2019 Yang ...................... H04B 7/088
2020/0084793 A1* 3/2020 Bai ................... H04W 72/1289
2021/0120585 A1* 4/2021 Yang .................. H04W 72/046
(Continued)

FOREIGN PATENT DOCUMENTS

WO WO-2021108817 A2 * 6/2021

OTHER PUBLICATIONS

International Search Report and Written Opinion—PCT/US2022/071094—ISA/EPO—dated Jul. 22, 2022.
(Continued)

*Primary Examiner* — Ivan O Latorre
(74) *Attorney, Agent, or Firm* — Harrity & Harrity, LLP

(57) ABSTRACT

Various aspects of the present disclosure generally relate to wireless communication. In some aspects, a transmitter node may determine a set of desired transmit beams to use for transmissions during a channel occupancy time (COT), wherein each transmit beam in the set of desired transmit beams is associated with an energy detection threshold (EDT). The transmitter node may configure a sensing beam associated with a directional listen-before-talk (LBT) procedure, wherein the sensing beam is associated with an EDT that is at least as strict as a strictest EDT associated with the set of desired transmit beams. The transmitter node may transmit using the set of desired transmit beams during the COT, wherein the COT is initiated based at least in part on an indication that the directional LBT procedure succeeded using the sensing beam. Numerous other aspects are described.

30 Claims, 12 Drawing Sheets

1000

1010 Determine a set of desired transmit beams to use for transmissions during a channel occupancy time, wherein each transmit beam in the set of desired transmit beams is associated with an energy detection threshold 1020 Configure a sensing beam associated with a directional LBT procedure, wherein the sensing beam is associated with an energy detection threshold that is at least as strict as a strictest energy detection threshold associated with the set of desired transmit beams 1030 Transmit using the set of desired transmit beams during the channel occupancy time, wherein the channel occupancy time is initiated based at least in part on an indication that the directional LBT procedure succeeded using the sensing beam

(56) References Cited

U.S. PATENT DOCUMENTS

| | | | | |
|---|---|---|---|---|
| 2021/0266914 | A1* | 8/2021 | Yoo | H04W 72/082 |
| 2021/0391906 | A1* | 12/2021 | Oteri | H04L 5/0048 |
| 2022/0124806 | A1* | 4/2022 | Hu | H04W 16/28 |
| 2022/0312482 | A1* | 9/2022 | Niu | H04W 16/28 |

OTHER PUBLICATIONS

Moderator (Qualcomm Incorporated) : "FL Summary for Channel Access Mechanism for 52.6GHz-71GHz Band", 3GPP Draft, R1-2101798, 3GPP TSG RAN WG1 Meeting #104-e, 3rd Generation Partnership Project (3GPP), Mobile Competence Centre, 650, Route Des Lucioles, F-06921, Sophia-Antipolis Cedex, France, vol. RAN WG1, no. Jan. 25, 2021-Feb. 5, 2021, Jan. 26, 2021 (Jan. 26, 2021), XP051975900, pp. 1-31, Retrieved from the Internet: URL: https://ftp.3gpp.org/tsg_ran/WG1_RL1/TSGR1_104-e/Docs/R1-2101798.zip R1-2101798 8.2.6 FL summary for channel access of 52.6GHz to 71 GHz band_v1.docx [retrieved on Jan. 26, 2021] paragraph [2.3.3]—paragraph [2.3.4] paragraph [2.7.1]—paragraph [2.7.3].

Qualcomm, et al., "Study on Supporting NR from 52.6 GHz to 71 GHz", 3GPP Draft, RP-210462, 3GPP TSG RAN meeting #91e, 3rd Generation Partnership Project (3GPP), Mobile Competence Centre, 650, Route Des Lucioles, F-06921, Sophia-Antipolis Cedex, France, vol. TSG RAN, No. Electronic Meeting, Mar. 16, 2021-Mar. 26, 2021, Mar. 15, 2021 (Mar. 15, 2021), XP051985807, pp. 1-14, Retrieved from the Internet: URL: https://ftp.3gpp.org/tsg_ran/TSG_RAN/TSGR_91e/Docs/RP-210462.zip RP-210462 SR for WI on NR 52_71GHz.docx [retrieved on Mar. 15, 2021] p. 2, line 17—line 26.

* cited by examiner

600

602
Determine sensing beam and associated EDT used in successful LBT

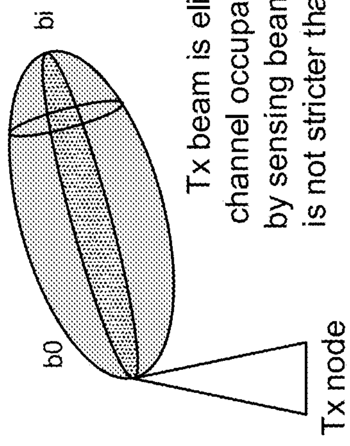

604
Tx beam is eligible for transmission during channel occupancy time if Tx beam is covered by sensing beam and associated with EDT that is not stricter than EDT used in successful LBT

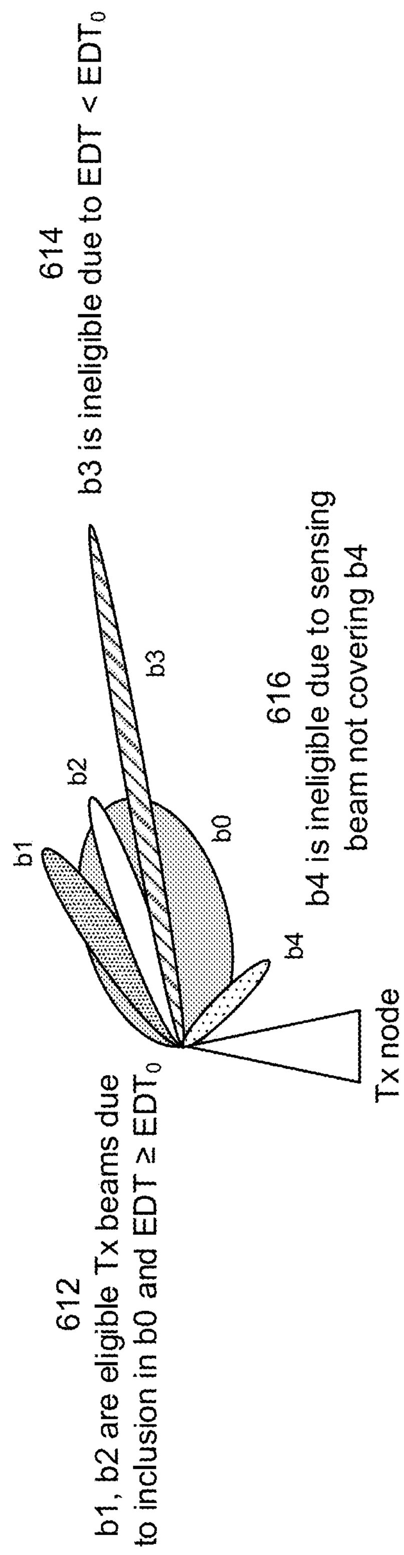

612
b1, b2 are eligible Tx beams due to inclusion in b0 and EDT ≥ $EDT_0$ 614
b3 is ineligible due to EDT < $EDT_0$ 616
b4 is ineligible due to sensing beam not covering b4

FIG. 6

ELIGIBLE TRANSMISSION BEAMS BASED ON DIRECTIONAL LISTEN-BEFORE-TALK

FIELD OF THE DISCLOSURE

Aspects of the present disclosure generally relate to wireless communication and to techniques and apparatuses associated with eligible transmission beams that are based on a directional listen-before-talk (LBT).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a transmitter node for wireless communication includes a memory and one or more processors, coupled to the memory, configured to: determine a set of desired transmit beams to use for transmissions during a channel occupancy time (COT), wherein each transmit beam in the set of desired transmit beams is associated with an energy detection threshold (EDT); configure a sensing beam associated with a directional listen-before-talk (LBT) procedure, wherein the sensing beam is associated with an EDT that is at least as strict as a strictest EDT associated with the set of desired transmit beams; and transmit using the set of desired transmit beams during the COT, wherein the COT is initiated based at least in part on an indication that the directional LBT procedure succeeded using the sensing beam.

In some aspects, a method of wireless communication performed by a transmitter node includes determining a set of desired transmit beams to use for transmissions during a COT, wherein each transmit beam in the set of desired transmit beams is associated with an EDT; configuring a sensing beam associated with a directional LBT procedure, wherein the sensing beam is associated with an EDT that is at least as strict as a strictest EDT associated with the set of desired transmit beams; and transmitting using the set of desired transmit beams during the COT, wherein the COT is initiated based at least in part on an indication that the directional LBT procedure succeeded using the sensing beam.

In some aspects, an apparatus for wireless communication includes means for determining a set of desired transmit beams to use for transmissions during a COT, wherein each transmit beam in the set of desired transmit beams is associated with an EDT; means for configuring a sensing beam associated with a directional LBT procedure, wherein the sensing beam is associated with an EDT that is at least as strict as a strictest EDT associated with the set of desired transmit beams; and means for transmitting using the set of desired transmit beams during the COT, wherein the COT is initiated based at least in part on an indication that the directional LBT procedure succeeded using the sensing beam.

In some aspects, a non-transitory computer-readable medium storing a set of instructions for wireless communication includes one or more instructions that, when executed by one or more processors of a transmitter node, cause the transmitter node to: determine a set of desired transmit beams to use for transmissions during a COT, wherein each transmit beam in the set of desired transmit beams is associated with an EDT; configure a sensing beam associated with a directional LBT procedure, wherein the sensing beam is associated with an EDT that is at least as strict as a strictest EDT associated with the set of desired transmit beams; and transmit using the set of desired transmit beams during the COT, wherein the COT is initiated based at least in part on an indication that the directional LBT procedure succeeded using the sensing beam.

In some aspects, a transmitter node for wireless communication includes a memory and one or more processors, coupled to the memory, configured to: receive an indication that a directional LBT procedure succeeded using a sensing beam associated with an EDT; determine whether a transmit beam is eligible to be used to transmit during a COT that is initiated based at least in part on the indication that the directional LBT procedure succeeded using the sensing beam; and transmit using the transmit beam during the COT based at least in part on determining that the transmit beam is eligible to be used to transmit during the COT.

In some aspects, a method of wireless communication performed by a transmitter node includes receiving an indication that a directional LBT procedure succeeded using a sensing beam associated with an EDT; determining whether a transmit beam is eligible to be used to transmit during a COT that is initiated based at least in part on the indication that the directional LBT procedure succeeded using the sensing beam; and transmitting using the transmit beam during the COT based at least in part on determining that the transmit beam is eligible to be used to transmit during the COT.

In some aspects, an apparatus for wireless communication includes means for receiving an indication that a directional LBT procedure succeeded using a sensing beam associated with an EDT; means for determining whether a transmit beam is eligible to be used to transmit during a COT that is initiated based at least in part on the indication that the directional LBT procedure succeeded using the sensing beam; and means for transmitting using the transmit beam during the COT based at least in part on determining that the transmit beam is eligible to be used to transmit during the COT.

In some aspects, a non-transitory computer-readable medium storing a set of instructions for wireless communication includes one or more instructions that, when executed by one or more processors of a transmitter node, cause the transmitter node to: receive an indication that a directional LBT procedure succeeded using a sensing beam associated with an EDT; determine whether a transmit beam is eligible to be used to transmit during a COT that is initiated based at least in part on the indication that the directional LBT procedure succeeded using the sensing beam; and transmit using the transmit beam during the COT based at least in part on determining that the transmit beam is eligible to be used to transmit during the COT.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-9 are diagrams illustrating examples associated with eligible transmission beams based on a directional LBT procedure, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
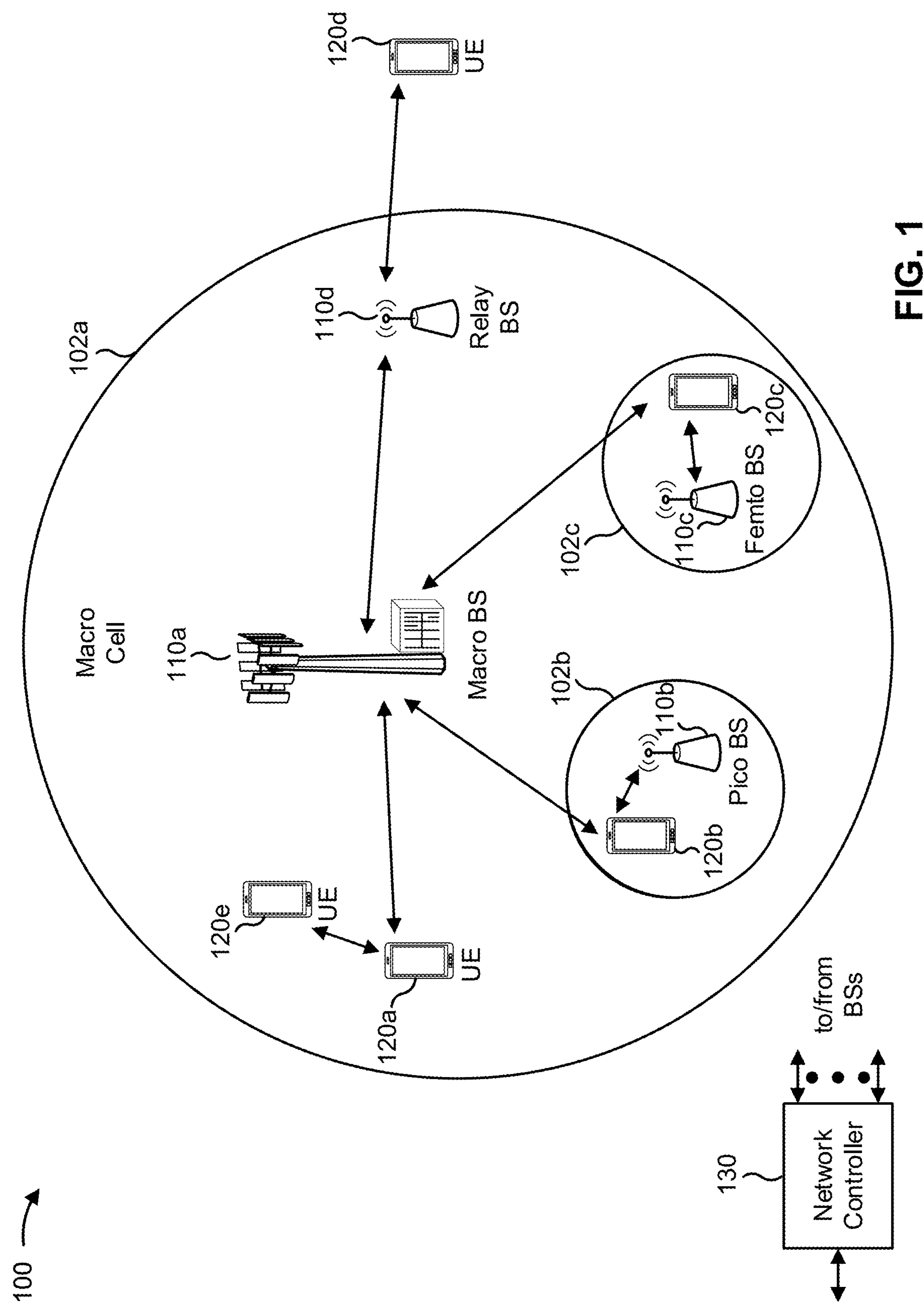
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, devices of wireless network 100 may communicate with one another using a licensed radio frequency spectrum band and/or an unlicensed radio frequency spectrum band. For example, a base station 110 and a UE 120 may communicate using a RAT such as Licensed-Assisted Access (LAA), Enhanced LAA (eLAA), Further Enhanced LAA (feLAA), and/or NR-Unlicensed (NR-U), among other examples. In some aspects, one or more wireless local area network (WLAN) access points and one or more WLAN stations (not shown in FIG. 1) may communicate with one another using only the unlicensed radio frequency spectrum band (and not the licensed radio frequency spectrum band). The unlicensed radio frequency spectrum band may therefore be shared by the base stations 110, the UEs 120, the WLAN access point(s), the WLAN station(s), and/or other devices. Because the unlicensed radio frequency spectrum band may be shared by devices operating under different protocols (e.g., different RATs), transmitting devices may need to contend for access to the unlicensed radio frequency spectrum band prior to transmitting over the unlicensed radio frequency spectrum band.

For example, in a shared or unlicensed frequency band, a transmitting device may contend against other devices for channel access before transmitting on a shared or unlicensed channel to reduce and/or prevent collisions on the shared or unlicensed channel. To contend for channel access, the transmitting device may perform a channel access procedure, such as a listen-before-talk (or listen-before-transmit) (LBT) procedure or another type of channel access procedure, for shared or unlicensed frequency band channel access. The channel access procedure may be performed to determine whether the physical channel (e.g., the radio resources of the channel) are free to use or are busy (e.g., in use by another wireless communication device such as another UE, an IoT device, and/or a WLAN device, among other examples). The channel access procedure may include sensing or measuring the physical channel (e.g., performing a reference signal received power (RSRP) measurement, detecting an energy level, or performing another type of measurement) during a channel access gap (which may also be referred to as a contention window) and determining whether the shared or unlicensed channel is free or busy based at least in part on the signals sensed or measured on the physical channel (e.g., based at least in part on whether the measurement satisfies a threshold, such as an energy detection threshold (EDT)). If the transmitting device determines that the channel access procedure was successful, the transmitting device may perform one or more transmissions on the shared or unlicensed channel during a transmission opportunity (TXOP), which may extend for a channel occupancy time (COT).

As indicated above, FIG. 1 is provided as an example. Other examples may differ from what is described with regard to FIG. 1.

Figure 2:
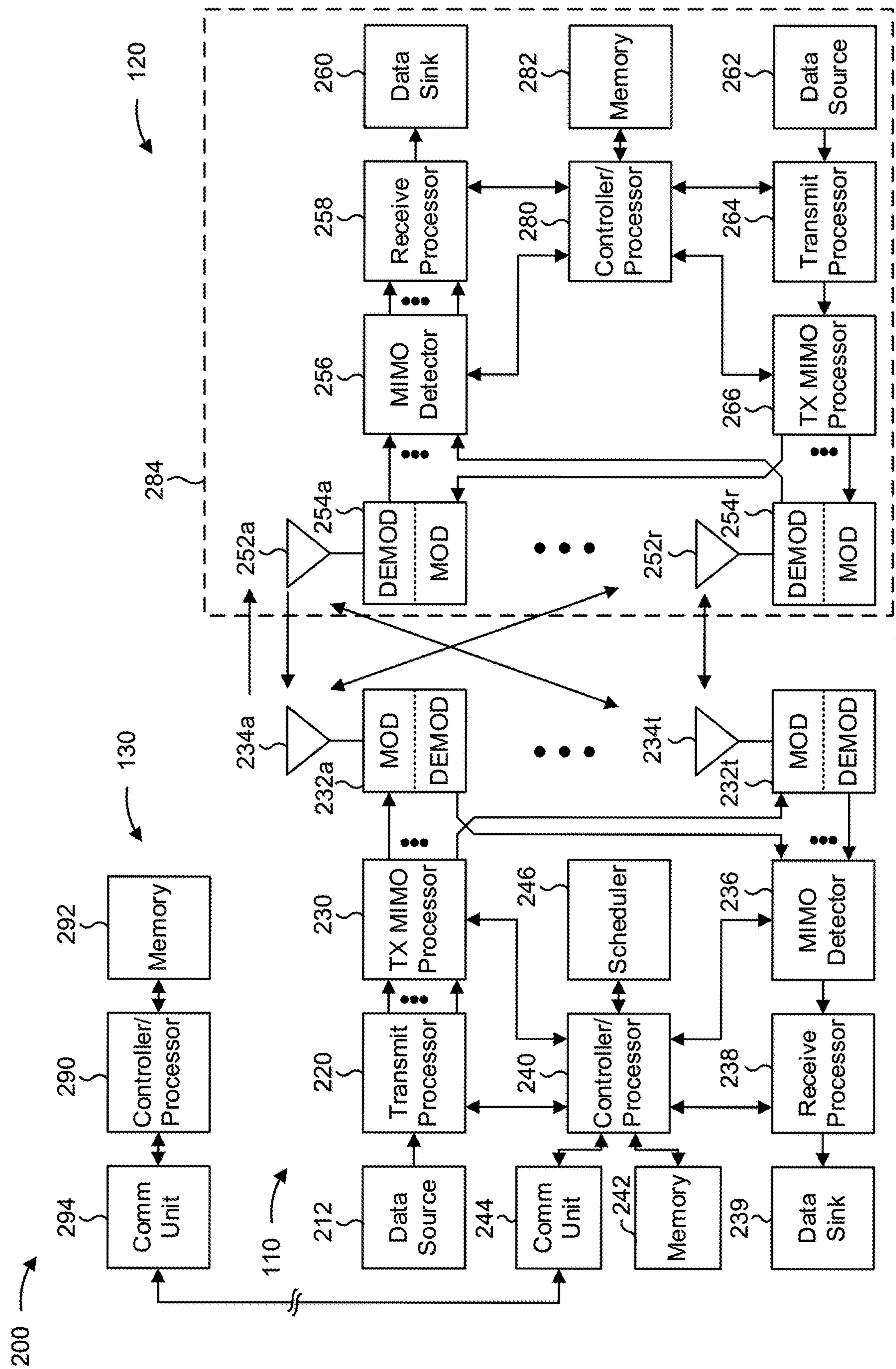
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream.

Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., as described with reference to FIGS. 4-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., as described with reference to FIGS. 4-11).

Controller/processor 240 of base station 110, controller/processor 280 of UE 120, and/or any other component(s) of FIG. 2 may perform one or more techniques associated with eligible transmission beams based on a directional listen-before-talk (LBT), as described in more detail elsewhere herein. In some aspects, a transmitter node, a receiver node, an initiator node, and/or a responder node as described herein is the base station 110 or the UE 120, is included in the base station 110 or the UE 120, or includes one or more components of the base station 110 or the UE 120 shown in FIG. 2. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, the transmitter node includes means for determining a set of desired transmit beams to use for transmissions during a channel occupancy time (COT), wherein each transmit beam in the set of desired transmit beams is associated with an energy detection threshold (EDT); means for configuring a sensing beam associated with a directional LBT procedure, wherein the sensing beam is associated with an energy detection threshold that is at least as strict as a strictest EDT associated with the set of desired transmit beams; and/or means for transmitting using the set of desired transmit beams during the COT, wherein the COT is initiated based at least in part on an indication that the directional LBT procedure succeeded using the sensing beam. In some aspects, the means for the transmitter node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. Additionally, or alternatively, the means for the transmitter node to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the transmitter node includes means for receiving an indication that a directional LBT procedure succeeded using a sensing beam associated with an EDT; means for determining whether a transmit beam is eligible to be used to transmit during a COT that is initiated based at least in part on the indication that the directional LBT procedure succeeded using the sensing beam; and/or means for transmitting using the transmit beam during the COT based at least in part on determining that the transmit beam is eligible to be used to transmit during the COT. In some aspects, the means for the transmitter node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. Additionally, or alternatively, the means for the transmitter node to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
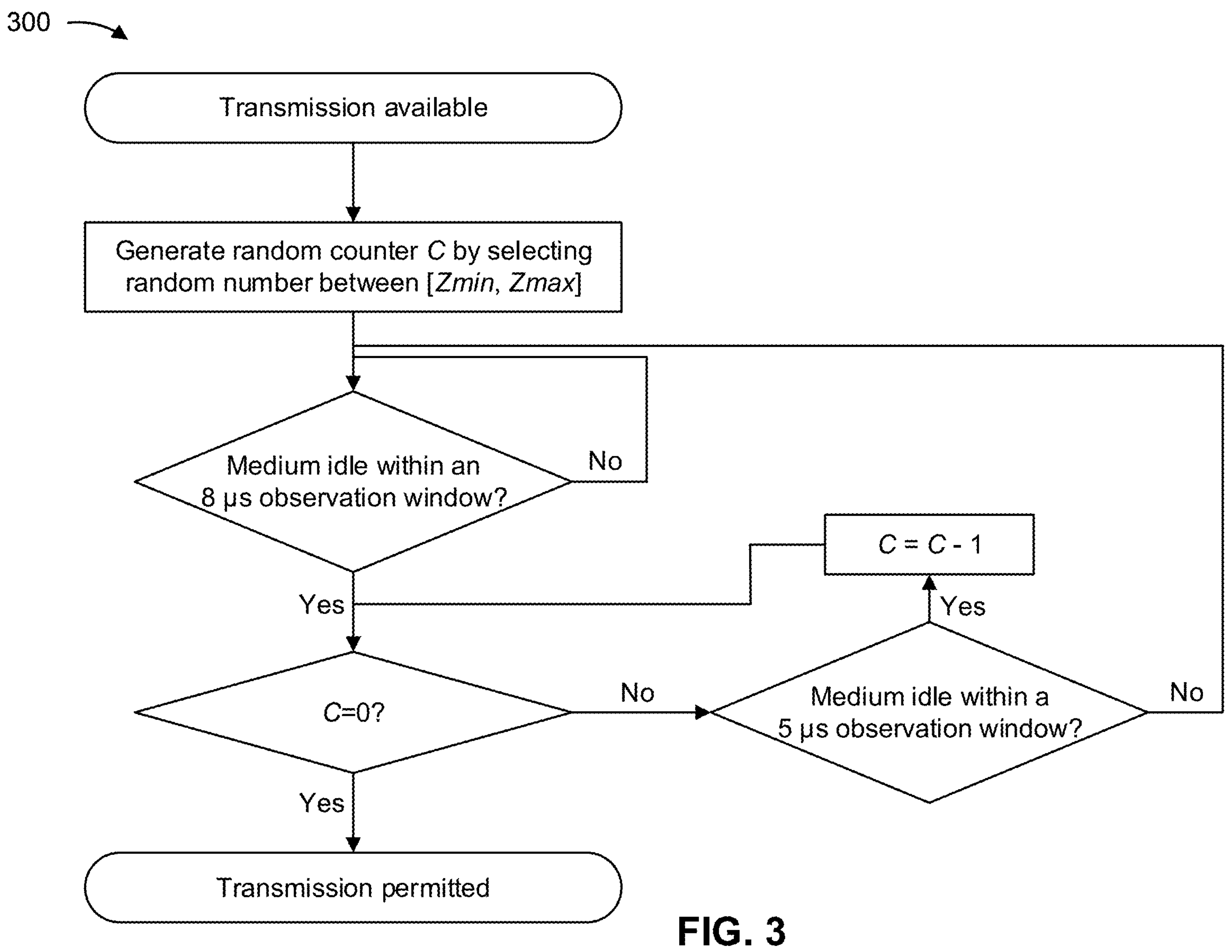
FIG. 3 is a diagram illustrating an example of a channel access procedure, in accordance with the present disclosure.

FIG. 3 is a diagram illustrating an example 300 of a channel access procedure, in accordance with the present disclosure. For example, as described in further detail herein, the channel access procedure may be performed to initiate a COT during transmissions can occur over an unlicensed channel, and a device performing the channel access procedure to initiate a COT may be referred to as an initiating node. In some cases, the initiating node that performs the channel access procedure may correspond to a transmitter (Tx) node that has a need to transmit one or more messages to a receiver (Rx) node. Additionally, or alternatively, as described in further detail below, the Tx node may configure the Rx node to perform the channel access procedure such that access to the unlicensed channel may depend, at least in part, on measurements that reflect interference conditions at the Rx node. Furthermore, in some cases, an initiating node that acquires a COT by performing a successful channel access procedure may share the COT with another device, referred to as a responding node, by starting transmissions over the unlicensed channel during the COT.

To accommodate increasing traffic demands, there have been various efforts to improve spectral efficiency in wireless networks and thereby increase network capacity (e.g., via use of higher order modulations, advanced MIMO antenna technologies, and/or multi-cell coordination techniques, among other examples). Another way to potentially improve network capacity is to expand system bandwidth. However, available spectrum in lower frequency bands that have traditionally been licensed or otherwise allocated to mobile network operators has become very scarce. Accordingly, various technologies have been developed to enable a cellular radio access technology (RAT) to operate in unlicensed or other shared spectrum. For example, Licensed-Assisted Access (LAA) uses carrier aggregation on a downlink to combine LTE in a licensed frequency band with LTE in an unlicensed frequency band (e.g., the 2.4 and/or 5 GHz bands already populated by WLAN or "Wi-Fi" devices). In other examples, Enhanced LAA (eLAA) and Further Enhanced LAA (feLAA) technologies enable both uplink and downlink LTE operation in unlicensed spectrum, MulteFire is an LTE-based technology that operates in unlicensed and shared spectrum in a standalone mode, and NR-U enables NR operation in unlicensed spectrum.

In an unlicensed RF band or shared spectrum (e.g., the 6 GHz unlicensed RF band and/or the 60 GHz band), all or a portion of the frequency band may be licensed to entities referred to as fixed service incumbents. Accordingly, when a device is operating in unlicensed or shared spectrum (e.g., using LAA, eLAA, feLAA, MulteFire, and/or NR-U), one challenge that arises is the need to ensure fair coexistence with other devices that may be operating in the unlicensed or shared spectrum. For example, prior to gaining access to and/or transmitting over an unlicensed channel, regulations may specify that a transmitting device (e.g., base station 110 and/or UE 120) is to perform a listen-before-talk (LBT) procedure to contend for access to the unlicensed channel. The LBT procedure may include a clear channel assessment (CCA) procedure to determine whether the unlicensed channel is available (e.g., unoccupied by other transmitters). In particular, a device performing a CCA procedure may detect an energy level on an unlicensed channel and determine whether the energy level satisfies (e.g., is less than or equal to) a threshold, which may be referred to herein as an energy detection threshold (EDT). When the energy level satisfies (e.g., is below) the EDT, the LBT procedure is deemed to be successful and the transmitting device may gain access to the unlicensed channel for a duration referred to as a COT. During the COT, the transmitting device can perform one or more transmissions without having to perform any additional LBT operations. However, when the energy level fails to satisfy (e.g., equals or exceeds) the EDT, the LBT procedure is deemed to have failed and contention to access the unlicensed channel by the transmitting device is unsuccessful.

In cases where the LBT procedure fails because the CCA procedure results in a determination that the unlicensed channel band is unavailable (e.g., because the energy level detected on the unlicensed channel exceeds the EDT, indicating that another device is already using the channel), the CCA procedure may be performed again at a later time. In environments in which the transmitting device may be starved of access to an unlicensed channel (e.g., due to WLAN activity or transmissions by other devices), an extended CCA (eCCA) procedure may be employed to increase the likelihood that the transmitting device will successfully obtain access to the unlicensed channel. For example, a transmitting device performing an eCCA procedure may perform a random quantity of CCA procedures (from 1 to q), in accordance with an eCCA counter. If and/or when the transmitting device senses that the channel has become clear, the transmitting device may start a random wait period based on the eCCA counter and start to transmit if the channel remains clear over the random wait period.

Accordingly, to facilitate spectrum sharing on an operating channel, a device seeking to initiate transmissions may be required to perform a CCA check in the operating channel before a single transmission or a burst of transmissions. For example, as shown in FIG. 3, the CCA check may be initiated at the end of an operating channel occupied slot time when a transmission is available at the initiating device, and the initiating device may perform the CCA check using an EDT. In some aspects, the EDT for the CCA check may defined as −80 decibel-milliwatts (dBm)+10×$\log_{10}$ (Operating/Channel Bandwidth (in MHz))+10×$\log_{10}$ ($P_{max}/P_{out}$), where $P_{out}$ is an RF output power in terms of an effective isotropic radiated power, sometimes referred to as an equivalent isotropic radiated power (EIRP) in watts, and $P_{max}$, is an RF output power limit in terms of an EIRP in watts. As further shown, the initiating device may generate a random counter C by selecting a random number between Zmin and Zmax, and may then determine whether the operating channel is idle (e.g., unoccupied) within an 8 microsecond (μs) observation window. For example, the initiating device may measure an energy level on the operating channel and may determine that the operating channel is occupied if the energy level fails to satisfy (e.g., equals or exceeds) the EDT that is based on the EIRP parameters $P_{max}$, and $P_{out}$ and the operating bandwidth. In cases where the initiating device determines that the operating channel is occupied (e.g., the medium is not idle within an 8 μs observation window), the initiating device cannot transmit or enable any other devices to transmit in the operating channel.

As further shown in FIG. 3, the initiating device may reattempt the CCA check until the operating channel is determined to be idle within an 8 μs observation window (e.g., based on the measured energy level satisfying the EDT threshold). In such cases, if and/or when the initiating device determines that the channel is not occupied for a minimum of 8 μs, the initiating device may defer transmissions for a random number of empty slots, which is based on the value of the random counter C. For example, if C is not equal to zero, the initiating device may determine whether the operating channel is idle within a 5 μs observation window. If the operating channel is idle within the 5 μs observation window, the random counter C may be decremented, and the initiating device may again determine whether the random counter C is equal to zero. When the random counter C reaches zero, the initiating device may be permitted to transmit in the operating channel, resume transmitting in the operating channel, and/or enable other devices to transmit in the operating channel. For example, as described herein, the total time that the device initiating transmissions can use the operating channel may be defined as the COT, which is generally less than 5 milliseconds (ms), after which the initiating device may need to perform a new CCA check in a similar manner as described above. Furthermore, in cases where a device correctly receives a packet that was intended for the device, the receiving device may skip the CCA check and immediately proceed with transmitting in the operating channel regardless of whether the receiving device is or is not initiating transmissions over the operating channel. In such cases, there is typically no requirement related to how long of a gap is needed between a transmission by an initiating device (that performed the CCA check) and a transmission by the responding device that received the transmission from the initiating device. However, a consecutive sequence of transmissions without a new CCA check cannot exceed the duration of a COT that would be initiated by a successful CCA check.

As indicated above, FIG. 3 is provided as an example. Other examples may differ from what is described with regard to FIG. 3.

Figure 4:
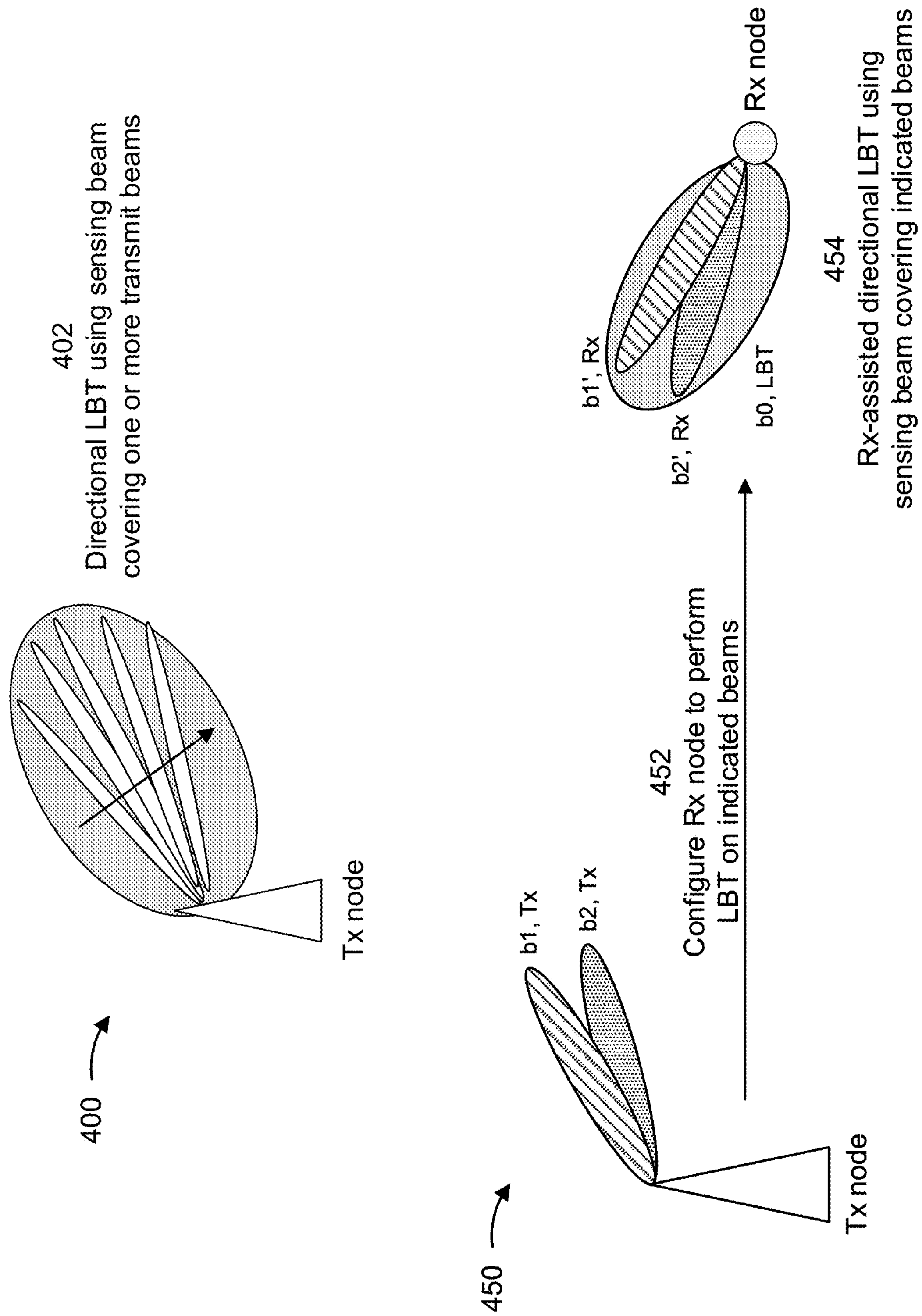
FIG. 4 is a diagram illustrating examples of a directional listen-before-talk (LBT) procedure, in accordance with the present disclosure.

FIG. 4 is a diagram illustrating examples 400, 450 of a directional LBT procedure, in accordance with the present disclosure. For example, in a 60 GHz band or other high frequency band subject to an LBT requirement (e.g., a mmW band), a transmitter (Tx) node and a receiver (Rx) node may communicate using directional beams to improve performance. However, current LBT specifications are generally performed using omnidirectional sensing, and do not take directional sensing into consideration. Accordingly, in some aspects, a device seeking to initiate transmissions over a shared or unlicensed channel may perform a directional LBT procedure to sense an energy level on the shared or unlicensed channel within the footprint of a sensing beam. For example, in some aspects, the sensing beam may correspond to a Tx beam that the initiating device is to use to transmit over the shared or unlicensed channel, or there may be a mismatch between the sensing beam and the Tx beam. For example, as shown by reference number 402, the initiating device may perform a directional LBT using a sensing beam that covers one or more Tx beams. For example, in order to perform an SSB burst in a beam sweep, the Tx node (e.g., a base station 110) may perform a directional LBT using a wide sensing beam to cover several narrow transmission beams to be used to transmit the SSB burst, which may be more efficient than performing a directional LBT for each SSB beam. For example, if the directional LBT procedure performed using the wide sensing beam is successful, the Tx node may transmit using any Tx beam included in or covered by the sensing beam.

Additionally, or alternatively, as shown by example 450, a directional LBT procedure may be configured as an Rx-assisted directional LBT, sometimes referred to as Class A Rx Assisted directional LBT, where the Rx node is configured to perform energy detection measurements in order to determine interference conditions associated with highly directional channels (e.g., because energy detection measurements at the Tx node may reflect conditions of the communication channel at the Rx node). For example, as shown by reference number 452, a Tx node seeking to initiate transmissions over a shared or unlicensed channel may configure an Rx node to perform a directional LBT on one or more indicated beams. In some aspects, the Tx node may configure the Rx node to perform the directional LBT using short control signaling. As used herein, “short control signaling” refers to control transmissions that are exempt from a requirement to first sense the channel for other signals during a period that is typically constrained to be less than 10 ms within a 100 ms observation period. Alternatively, the Tx node may configure the Rx node to perform the directional LBT using control signaling during a COT that was initiated by a successful LBT procedure. For example, in FIG. 4, the Tx node intends to transmit to the Rx node using a first Tx beam (b1) and a second Tx beam (b2), and therefore configures the Rx node to perform a directional LBT for the first and second Tx beams. Accordingly, as shown by reference number 454, the Rx node may perform an Rx-assisted directional LBT procedure using a sensing beam that covers the indicated Tx beams. For example, the Rx node may identify a first Rx beam (b1') that forms a beam pair with the first Tx beam and a second Rx beam (b2') that forms a beam pair with the second Tx beam, and the Rx node may perform a directional LBT procedure using a wide sensing beam (b0) that includes or otherwise covers the first and second Rx beams. Alternatively, the Rx node may perform a directional LBT procedure on each Rx beam individually. If the directional LBT procedure is successful, the Rx node may respond with an uplink transmission, which is considered to be a COT-claiming signal that marks the start of a COT during which the Tx node can transmit to the Rx node by uplink-downlink COT sharing. In this way, Rx-assisted directional LBT may provide a high degree of protection of victims from interference (e.g., by performing energy detection measurements that reflect interference conditions at the Rx node).

In some aspects, as described herein, the sensing beam that is used in a directional LBT procedure may be associated with an EDT. For example, as described above, the EDT may be based at least in part on the EIRP of the sensing beam and the operating channel bandwidth. Additionally, or alternatively, in some aspects, the EDT may be based on a beamwidth of the sensing beam and/or a beamwidth of one or more beams that are included in or covered by the sensing beam. For example, relative to a wide sensing beam, transmissions on a narrow beam may be associated with a higher beamforming gain. Accordingly, relative to a wide sensing beam, sensing on a narrow beam may be paired with a higher EDT (e.g., tolerating a higher energy level on the operating channel) assuming parity of the EIRP, operating bandwidth, and/or other parameters used to determine the EDT to be used in an LBT procedure.

As indicated above, FIG. 4 is provided as an example. Other examples may differ from what is described with regard to FIG. 4.

Figure 5:
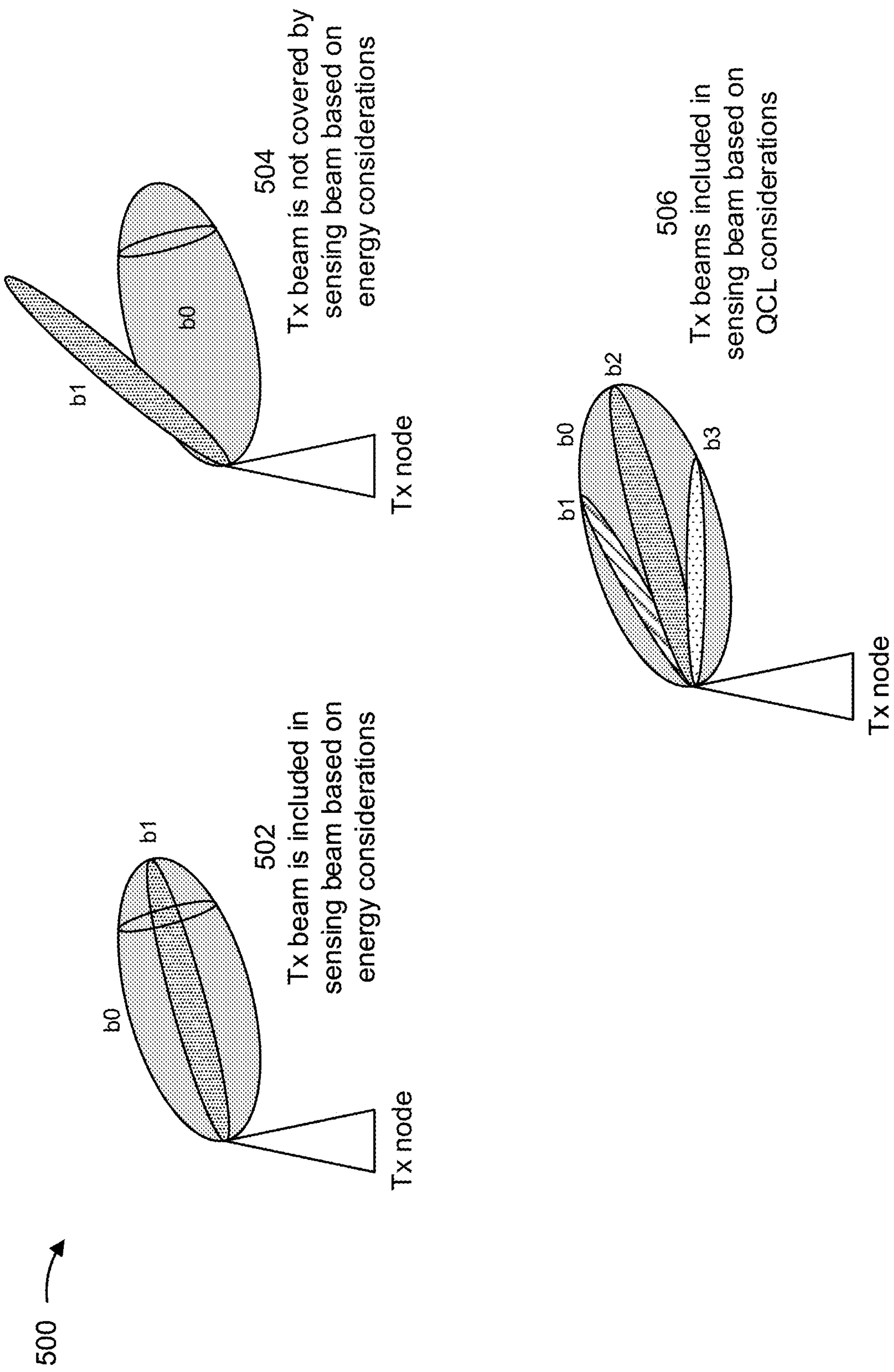
FIG. 5 is a diagram illustrating examples of beam inclusion rules that may be used in a directional LBT procedure, in accordance with the present disclosure.

FIG. 5 is a diagram illustrating examples 500 of beam inclusion rules that may be used in a directional LBT procedure, in accordance with the present disclosure.

As shown by reference numbers 502 and 504, a Tx beam $b_1$ may be included in an LBT sensing beam $b_0$ or not included in the LBT sensing beam $b_0$ based at least in part on energy considerations. For example, in order to determine whether a Tx node is permitted to transmit on a shared or unlicensed channel using the Tx beam $b_1$, the Tx node may perform an energy-based integration of the Tx beam $b_1$ over an angle of the LBT sensing beam $b_0$. Accordingly, the Tx node may determine whether the energy of the Tx beam $b_1$ is sufficiently included in the angle that corresponds to the footprint of the LBT sensing beam $b_0$. In this example, as shown by reference number 502, the Tx node may determine that the Tx beam $b_1$ is included in the LBT sensing beam $b_0$ based at least in part on the energy-based integration indicating that the energy of the Tx beam $b_1$ is included in the footprint of the LBT sensing beam $b_0$. Alternatively, as shown by reference number 504, the Tx node may determine that the Tx beam $b_1$ is not included or covered by the LBT sensing beam $b_0$ based at least in part on the energy considerations indicating that the energy of the Tx beam $b_1$ is located outside the footprint of the LBT sensing beam $b_0$.

Additionally, or alternatively, as shown by reference number 506, the Tx node may determine whether one or more Tx beams are included or covered by an LBT sensing beam $b_0$ based at least in part on quasi co-location (QCL) considerations. For example, as described herein, a first beam may be included in or covered by a second beam in cases where a reference signal and an associated physical channel (e.g., a DMRS and an associated physical uplink shared channel (PUSCH) or physical downlink shared channel (PDSCH)) transmitted on the first beam derives a QCL relationship (e.g., a QCL Type D relationship, or spatial Rx parameter) from a reference signal transmitted on the second beam. For example, in FIG. 5, an LBT sensing beam $b_0$ may include or cover Tx beams $b_1$, $b_2$, and $b_3$ based on the Tx beams $b_1$, $b_2$, and $b_3$ deriving a QCL from the LBT sensing beam $b_0$. In this example, the LBT sensing beam $b_0$ may be any suitable SSB or CSI-RS beam, and the Tx beams $b_1$, $b_2$, and $b_3$ that are included in or covered by the LBT sensing beam $b_0$ may be defined beams that derive a QCL Type D relationship from a reference signal sent using the SSB or CSI-RS beam corresponding to the LBT sensing beam $b_0$. In this way, QCL considerations may provide a simple test to determine whether a first beam includes or covers a second beam based on QCL considerations without having to perform complex geometrical energy-based integrations for the respective beams.

As indicated above, FIG. 5 is provided as an example. Other examples may differ from what is described with regard to FIG. 5.

FIG. 6 is a diagram illustrating an example 600 associated with eligible transmission beams based on a directional LBT procedure, in accordance with the present disclosure. In example 600, a Tx node may generally receive an indication that a directional LBT procedure was successful using a given sensing beam, and may determine whether one or more Tx beams are eligible to use for transmissions during a COT that was initiated by the successful directional LBT procedure. For example, in cases where the Tx node attempts the directional LBT procedure using the sensing beam, the Tx node may initiate the COT based on a physical layer indication that the directional LBT procedure was successful. Alternatively, in some aspects, the Tx node may transmit control signaling to an Rx node (not shown) to configure the Rx node to attempt the directional LBT procedure using the sensing beam, and the Tx node may receive, from the Rx node, a COT-claiming or COT-sharing signal that provides the indication that the directional LBT procedure succeeded.

Accordingly, as shown by reference number 602, the Tx node may determine one or more parameters associated with the sensing beam, and the Tx node may further determine an associated EDT that was used in the successful directional LBT procedure. The Tx node may then assess which Tx beams, if any, are eligible to use for transmissions during a COT that was initiated by the successful directional LBT procedure. For example, as shown by reference number 604, a Tx beam $b_i$ may be eligible for transmission during the COT if the Tx beam $b_i$ is included in or covered by the sensing beam $b_0$ (e.g., based on energy considerations and/or QCL considerations) and the EDT for sensing on the Tx beam is not stricter than the EDT that was used in the successful directional LBT procedure. For example, the EDT used in the successful directional LBT procedure may be represented as $EDT_0$, and the EDT associated with the Tx beam $b_i$ may be represented as $EDT_i$, which may be based at least in part on the EIRP of the Tx beam and the operating bandwidth of the Tx beam. For example, the value of $EDT_i$ may be defined as the EDT that should be used to allow transmissions over the Tx beam $b_i$ with a radiated power EIRPi over an operating bandwidth BWi after sensing over the Tx beam $b_i$.

Accordingly, given a successful directional LBT procedure using a sensing beam $b_0$ that is associated with an EDT, a Tx beam $b_i$ is eligible to use for transmissions during a COT initiated by the successful directional LBT procedure if the Tx beam $b_i$ is included in the sensing beam $b_0$ and the value of $EDT_i$ is not stricter than the EDT used in the successful directional LBT procedure (e.g., $EDT_0 \leq EDT_i$, where $EDT_0$ is the EDT used in the successful directional LBT procedure). In this way, when the Tx node wants to initiate a transmission on a new Tx beam that was not considered during the successful directional LBT procedure, the Tx node may determine whether the new Tx beam is eligible to use to transmit during the COT by determining whether the new beam is covered by the sensing beam and associated with an EDT that is equally strict or less strict than $EDT_0$. Furthermore, it should be noted that the condition requiring that the EDT of the Tx beam be no stricter than $EDT_0$ is always satisfied in cases where the Tx beam and the sensing beam are associated with the same EIRP (e.g., due to a correction term that accounts for the respective beam gains, which incentivizes narrow beam sensing with a higher EDT due to a higher beamforming gain in a main lobe direction). Conversely, if a narrower Tx beam included in a wider sensing beam uses a higher EIRP than the sensing beam, transmissions may not be allowed on the narrower Tx beam even though the narrower Tx beam is included in the wider sensing beam.

For example, as shown by reference number 612, Tx beams $b_1$ and b2 are eligible Tx beams because the Tx beams b1 and b2 are included in the sensing beam $b_0$ and are associated with EDTs that are not stricter than the EDT of the sensing beam. As further shown by reference number 614, a third Tx beam b3 that is included in the sensing beam is nonetheless ineligible to use during the COT because the third Tx beam has a lower EDT than the EDT used in the successful directional LBT procedure (e.g., due to the Tx beam being associated with a higher EIRP than the sensing beam). As further shown by reference number 616, a fourth Tx beam b4 that is associated with an EDT that is greater than or equal to the EDT used in the successful directional LBT procedure is nonetheless ineligible to use during the COT because the fourth Tx beam is not covered by the sensing beam (e.g., as determined by an energy-based integration of the fourth Tx beam and the sensing beam and/or based on the fourth Tx beam not deriving a QCL relationship from a reference signal transmitted on the sensing beam).

As indicated above, FIG. 6 is provided as an example. Other examples may differ from what is described with regard to FIG. 6.

Figure 7:
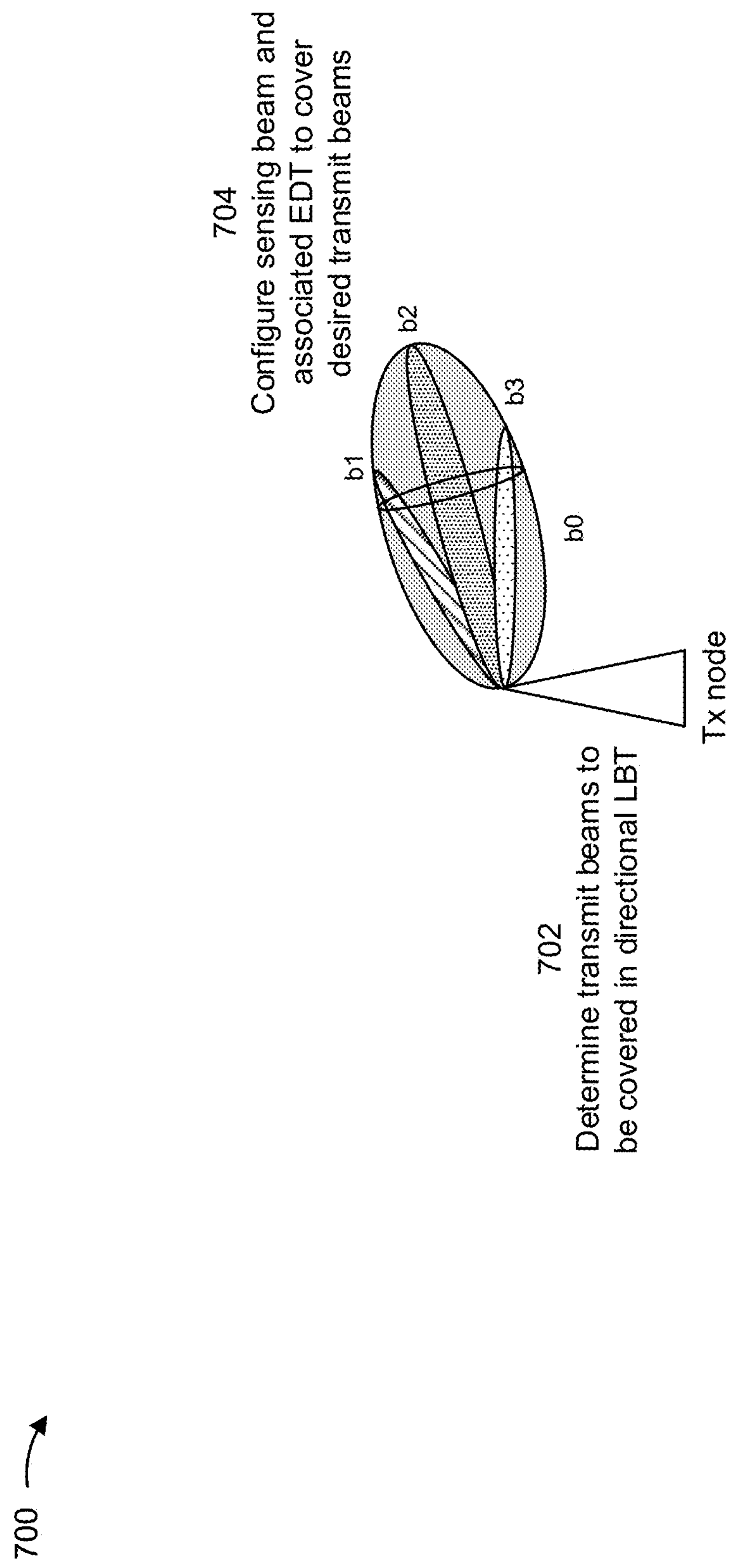

FIG. 7 is a diagram illustrating an example 700 associated with eligible transmission beams based on a directional LBT procedure, in accordance with the present disclosure. In example 700, a Tx node may define an adequate directional LBT procedure to cover a desired set of Tx beams to be covered by the directional LBT procedure. For example, as shown by reference number 702, the Tx node may determine a set of desired Tx beams (e.g., Tx beams b1, b2, b3, bn) to be covered by the directional LBT procedure. As further shown by reference number 704, the Tx node may configure a sensing beam $b_0$ and an associated EDT according to parameters that are adequate to satisfy a CCA check requirement for each Tx beam in the set of desired Tx beams. For example, in some aspects, the Tx node may configure the sensing beam to include or cover all of the Tx beams in the set of desired Tx beams (e.g., based on energy considerations and/or QCL considerations), and the Tx node may further determine an $EDT_0$ for the sensing beam based on EDTs for each Tx beam in the set of desired Tx beams.

For example, the value of $EDT_0$ to be used in the directional LBT procedure using the sensing beam may be less than or equal to a minimum EDT among EDT values associated with each Tx beam in the set of desired Tx beams. In this case, each Tx beam may be associated with a respective EDT, which may be based at least in part on an EIRP of the Tx beam and an operating bandwidth of the Tx beam. Additionally, or alternatively, in some aspects, the EDT associated with a Tx beam may be based on a beamwidth of the Tx beam (e.g., allowing a higher EDT for a narrower beam) and/or a tolerable interference level on an Rx beam paired with the Tx beam. Furthermore, in cases where the EDT accounts for a tolerable interference level on an Rx beam and the initiator node performing the directional LBT procedure is the Tx node, the tolerable interference level may be signaled to the initiator node. In any case, to configure an adequate directional LBT covering the desired Tx beams, the EDT that is established for the sensing beam may need to be at least as strict as a strictest EDT associated with the set of desired Tx beams. In other words, the sensing beam may be configured such that $EDT_0 \leq \min_i\{EDT_i\}$, where $EDT_i$ is a test energy detection threshold assuming a same sensing or transmitting beam for Tx beam $b_i$. In this case, $EDT_0$ may be associated with the sensing beam $b_0$ and $EDT_i$ may be associated with a desired Tx beam $b_i$, such as Tx beam $b_1$, $b_2$, or $b_3$. Further, the value of $EDT_0$ may be less than or equal to a minimum of test EDTs associated with the desired Tx beams.

In this way, when a device is configuring a sensing beam to be used to allow transmissions on one or more Tx beams, the device may configure an adequate sensing beam that includes or covers the one or more Tx beams and has an EDT that satisfies the condition $EDT_0 \leq \min_i \{EDT_i\}$.

As indicated above, FIG. 7 is provided as an example. Other examples may differ from what is described with regard to FIG. 7.

Figure 8:
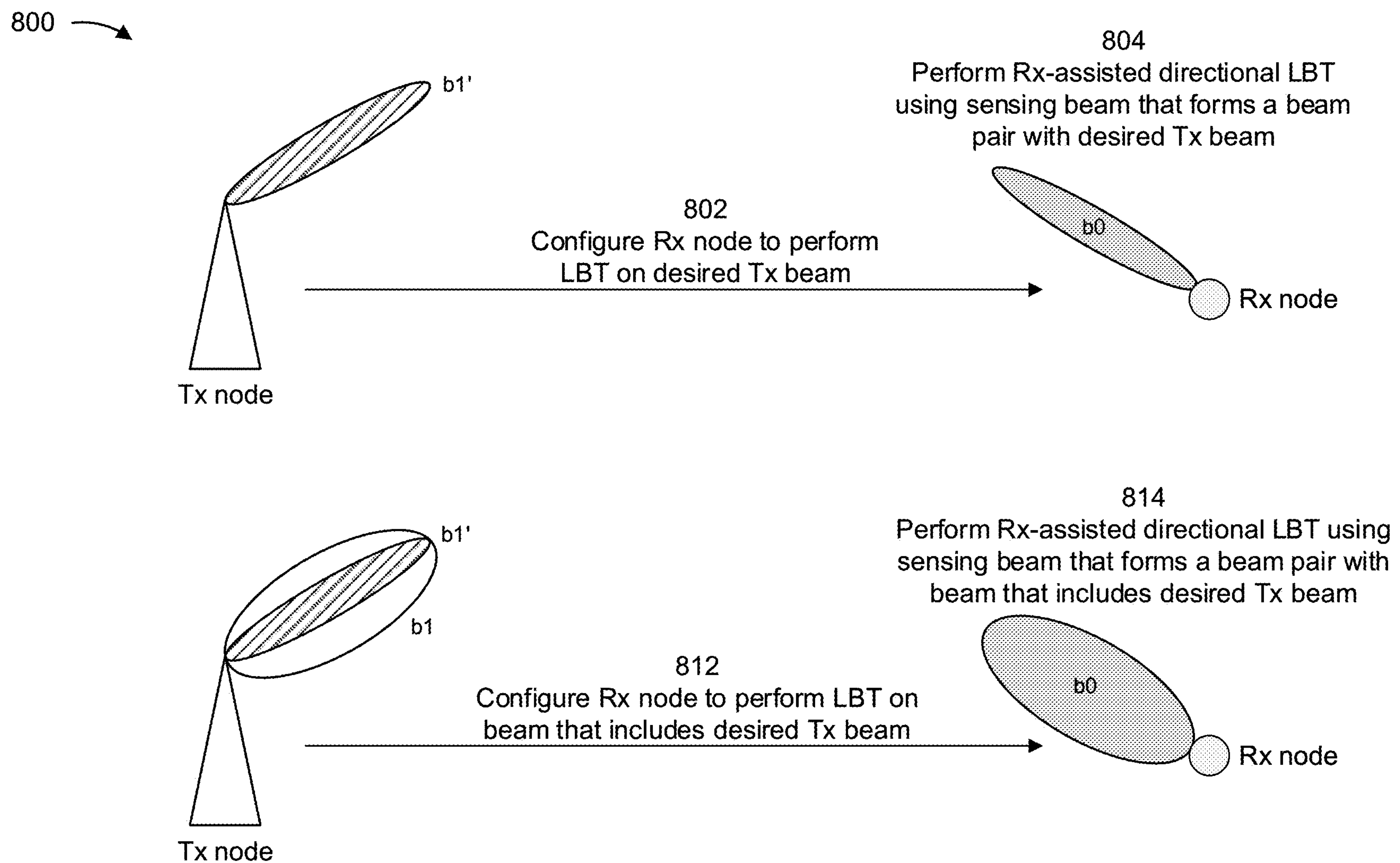

FIG. 8 is a diagram illustrating an example 800 associated with eligible transmission beams based on a directional LBT procedure, in accordance with the present disclosure. As shown in FIG. 8, example 800 includes communication between a Tx node and an Rx node. In some aspects, the Tx node and the Rx node may communicate over a shared or unlicensed channel subject to an LBT requirement. Furthermore, as shown in FIG. 8 and described herein, the Tx node may configure the Rx node to perform a directional LBT procedure transmitting control signaling to the Rx node. For example, the control signaling may include downlink control information (DCI) transmitted during an existing COT and/or short control signaling that is exempt from the LBT requirement. In some aspects, the Tx node may configure the Rx node to perform the directional LBT procedure using a sensing beam that is configured at the Rx node to include or cover one or more Tx beams that the Tx node intends to use for transmissions to the Rx node. Accordingly, as described herein, example 800 illustrates one or more techniques that may be used to configure a sensing beam that includes or covers beams located at different sites (e.g., beams at the Tx node and the Rx node).

For example, as shown by reference number 802, the Tx node may transmit, to the Rx node, control signaling to configure the Rx node to attempt a directional LBT procedure on a desired Tx beam $b_1'$. In this example, the Tx node may elect to use the desired Tx beam $b_1'$ for transmissions to the Rx node, whereby the control signaling transmitted from the Tx node to the Rx node may configure the Rx node to perform an Rx-assisted directional LBT procedure. For example, the Tx node may configure the Rx node to perform the Rx-assisted directional LBT procedure to request that the Rx node acquire a new COT to be shared with the Tx node (e.g., by uplink-downlink COT sharing). For example, the control signaling may be transmitted during an existing COT to request that the Rx node acquire and share a new COT based on a Category-4 directional LBT procedure (e.g., LBT with a random backoff and a variable size contention window), or the control signaling may be transmitted to request that the Rx node perform a Category-2 directional LBT procedure (e.g., LBT without a random backoff) to obtain beam-specific Rx assistance information (e.g., related to interference measurements at the Rx node) without acquiring a new COT, among other examples.

In some aspects, prior to the Tx node transmitting the control signaling to configure the Rx node to attempt the directional LBT procedure, the Tx node and the Rx node may establish one or more beam pairs to be used for communication over the shared or unlicensed channel subject to the LBT requirement. For example, the Tx node and the Rx node may establish the one or more beam pairs during an initial beam establishment procedure, a beam adjustment or beam refinement procedure, and/or a beam failure recovery procedure, among other examples. In general, the one or more beam pairs may each include a Tx beam that is paired with a corresponding Rx beam (e.g., a Tx beam at the Tx node that is paired with an Rx beam at the Rx node). Accordingly, in order to configure the Rx node to perform the directional LBT procedure using a sensing beam that is adequate to cover the desired Tx beam, the Tx node may signal (e.g., via a transmission configuration indication (TCI) state) a Tx beam that is paired with a corresponding Rx beam at the Rx node. For example, as shown in FIG. 6, the desired Tx beam $b_1'$ at the Tx node may be included in or covered by a sensing beam $b_0$ at the Rx node based at least in part on the desired Tx beam $b_1'$ forming a beam pair with the sensing beam $b_0$. In this case, the Tx node may signal the desired Tx beam $b_1'$ using a TCI state, and the Rx node may perform the Rx-assisted directional LBT procedure using the sensing beam $b_0$ that forms a beam pair with the desired Tx beam $b_1'$, as shown by reference number 804.

Alternatively, in some cases, the desired Tx beam $b_1'$ might not be paired with a corresponding Rx beam at the Rx node. In such cases, the Tx node may be unable to directly signal the desired Tx beam $b_1'$ to the Rx node by indicating a TCI state, and may instead need to refer to another (e.g., wider) beam that includes or covers the desired Tx beam $b_1'$ and is paired with a corresponding Rx beam at the Rx node. Accordingly, as shown by reference number 812, the Tx node may configure the Rx node to perform the directional LBT procedure on a beam $b_1$ that includes the desired Tx beam $b_1'$ (e.g., based on energy and/or QCL considerations) and forms a beam pair with a corresponding beam at the Rx node. As shown by reference number 814, the Rx node may then perform the Rx-assisted directional LBT procedure using a sensing beam $b_0$ that forms a beam pair with the beam $b_i$ that includes the desired Tx beam $b_1'$. For example, as described herein, the desired Tx beam $b_1'$ at the Tx node may be included in or covered by the sensing beam $b_0$ used at the Rx node based at least in part on the wider beam $b_1$ forming a beam pair with the sensing beam $b_0$ and the desired Tx beam $b_1'$ deriving a QCL relationship (e.g., a QCL Type D relationship) from the wider beam $b_1$ and/or producing energy that is located with the footprint of the wider beam $b_1$.

As indicated above, FIG. 8 is provided as an example. Other examples may differ from what is described with regard to FIG. 8.

Figure 9:
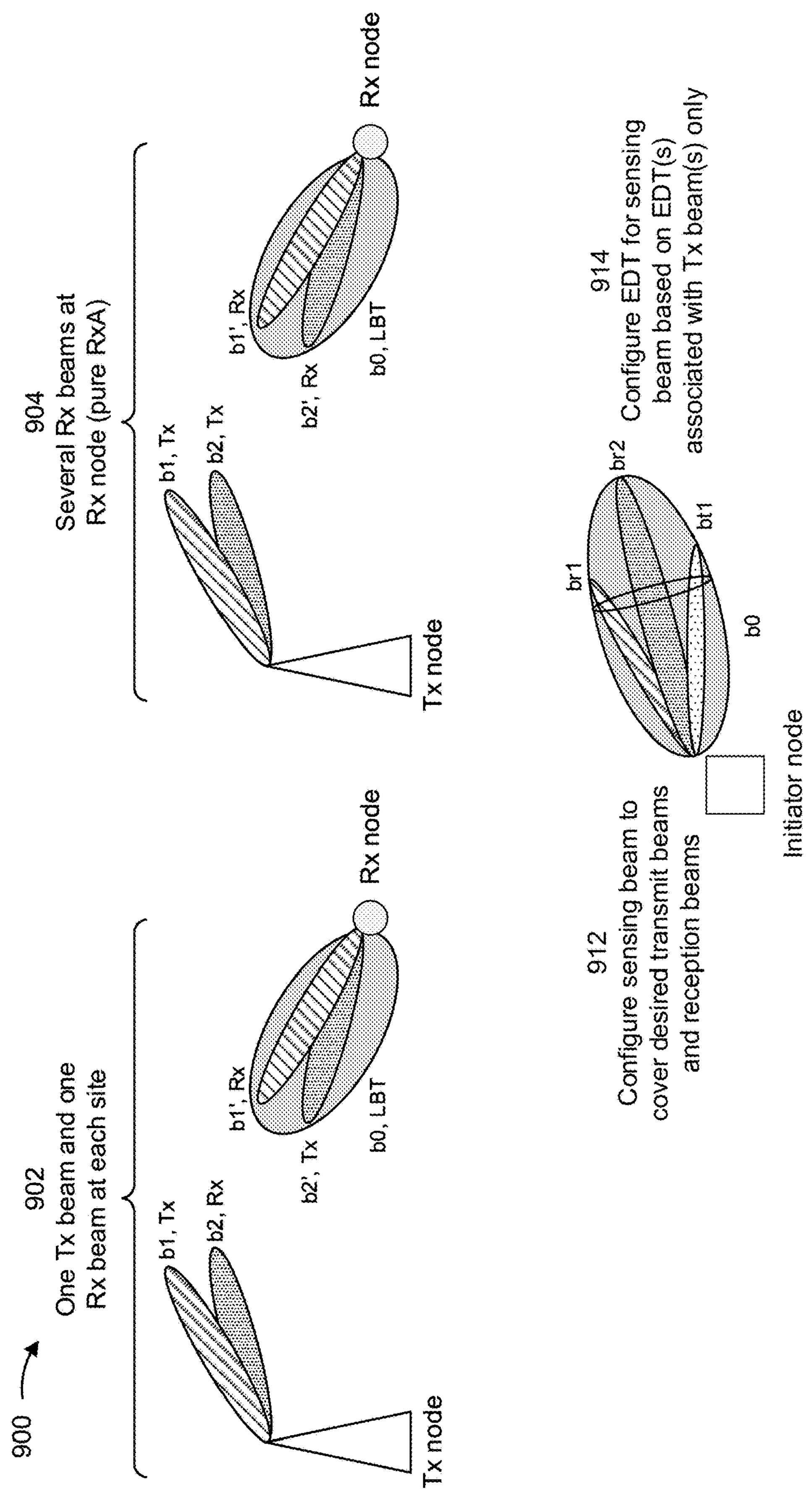

FIG. 9 is a diagram illustrating an example 900 associated with eligible transmission beams based on a directional LBT procedure, in accordance with the present disclosure. As shown in FIG. 9, example 900 includes communication between a Tx node and an Rx node. In some aspects, the Tx node and the Rx node may communicate over a shared or unlicensed channel subject to an LBT requirement. Furthermore, the Tx node or the Rx node may be configured to attempt a directional LBT procedure in order to initiate and/or share a COT during which the Tx node and/or the Rx node may transmit over the shared or unlicensed channel.

For example, as shown in FIG. 9 and described herein, an initiator node (e.g., the Tx node or the Rx node) may perform the directional LBT procedure using a sensing beam that is configured to include or cover Tx beams at both sites (e.g., Tx beams at the Tx node and Tx beams at the Rx node), which may be useful in a context of COT sharing and/or Rx-assisted directional LBT, among other examples. In other words, the sensing beam $b_0$ that the initiator node uses in the directional LBT procedure may include all Tx beams that the initiator node intends to use for transmissions to a responder node (e.g., a node sharing a COT acquired by the initiator node) and all Rx beams of the initiator node that include or cover Tx beams that the responder node intends to use for transmissions to the initiator node.

For example, as shown by reference number 902, the Tx node may intend to transmit to the Rx node using Tx beam $b_1$, and the Rx node may intend to transmit to the Tx node using Tx beam $b_2'$. Accordingly, in an example where the Rx node is configured to perform the directional LBT procedure, the sensing beam $b_0$ for the directional LBT procedure may include or cover the Tx beam $b_2'$ that the Rx node intends to use to transmit to the Tx node, and the sensing beam $b_0$ may further include or cover an Rx beam $b_1'$ that includes or covers the Tx beam $b_i$ that the Tx node intends to use to transmit to the Rx node (e.g., using the techniques described above with reference to FIG. 8 to determine an Rx beam that includes or covers a Tx beam at a different site).

In another example, as shown by reference number 904, the Tx node may intend to transmit to the Rx node using Tx beam $b_1$ and Tx beam $b_2$, and the Rx node may be configured to perform an adequate directional LBT procedure to cover the desired Tx beams b1 and b2 (e.g., in a pure Rx-assisted LBT scenario). Accordingly, in this example, the sensing beam $b_0$ for the directional LBT procedure may include or cover a first Rx beam $b_1'$ that includes or covers the first Tx beam $b_1$ and a second Rx beam $b_2'$ that includes or covers the second Tx beam $b_2$.

Accordingly, as shown in FIG. 9, and by reference number 912, an initiator node that is configured to attempt a directional LBT procedure (e.g., to acquire a COT and/or obtain Rx-assistance measurements) may configure a sensing beam $b_0$ to cover a mix of one or more Tx beams (e.g., beams $bt_1$, $bt_2$, $bt_n$) and one or more Rx beams (e.g., beams $br_1$, $br_2$, $br_n$). For example, the sensing beam $b_0$ may be configured to include or cover one or more Tx beams and one or more Rx beams that the initiator node is to use to communicate with a responder node during a COT that is initiated by a successful directional LBT procedure. Additionally, or alternatively, the sensing beam $b_0$ may be configured to include or cover a full set of Tx beams that the initiator node intends to use to transmit to the responder node, and/or a full set of Rx beams that are paired with a full set of Tx beams that the responder node intends to use to transmit to the initiator node. Furthermore, as shown by reference number 914, the sensing beam $b_0$ may be associated with an EDT that satisfies the expression $EDT_0 \leq \min_i\{EDT_i\}$, where $EDT_0$ is a value of the EDT associated with the sensing beam $b_0$ and $EDT_i$ is the test threshold assuming the same sensing or Tx beam for Tx beam $bt_i$. In this example, the values for $EDT_i$ may be limited to include only Tx beams at the site of the initiator node performing the directional LBT procedure to acquire a COT. In other words, the EDT for the sensing beam $b_0$ may be determined independent from any Rx beams that are paired with Tx beams at the responder node because the Tx beams used at the responder node may not be limited by any EDT after a COT has been acquired and shared by the initiator node. Alternatively, in some aspects, the EDT for the sensing beam $b_0$ may be based at least in part on a tolerable interference level on the Rx beams that are paired with Tx beams at the responder node (e.g., to provide Rx protection from harmful interference when the initiator node receives transmissions from the responder node after sharing the COT).

As indicated above, FIG. 9 is provided as an example. Other examples may differ from what is described with regard to FIG. 9.

Figure 10:
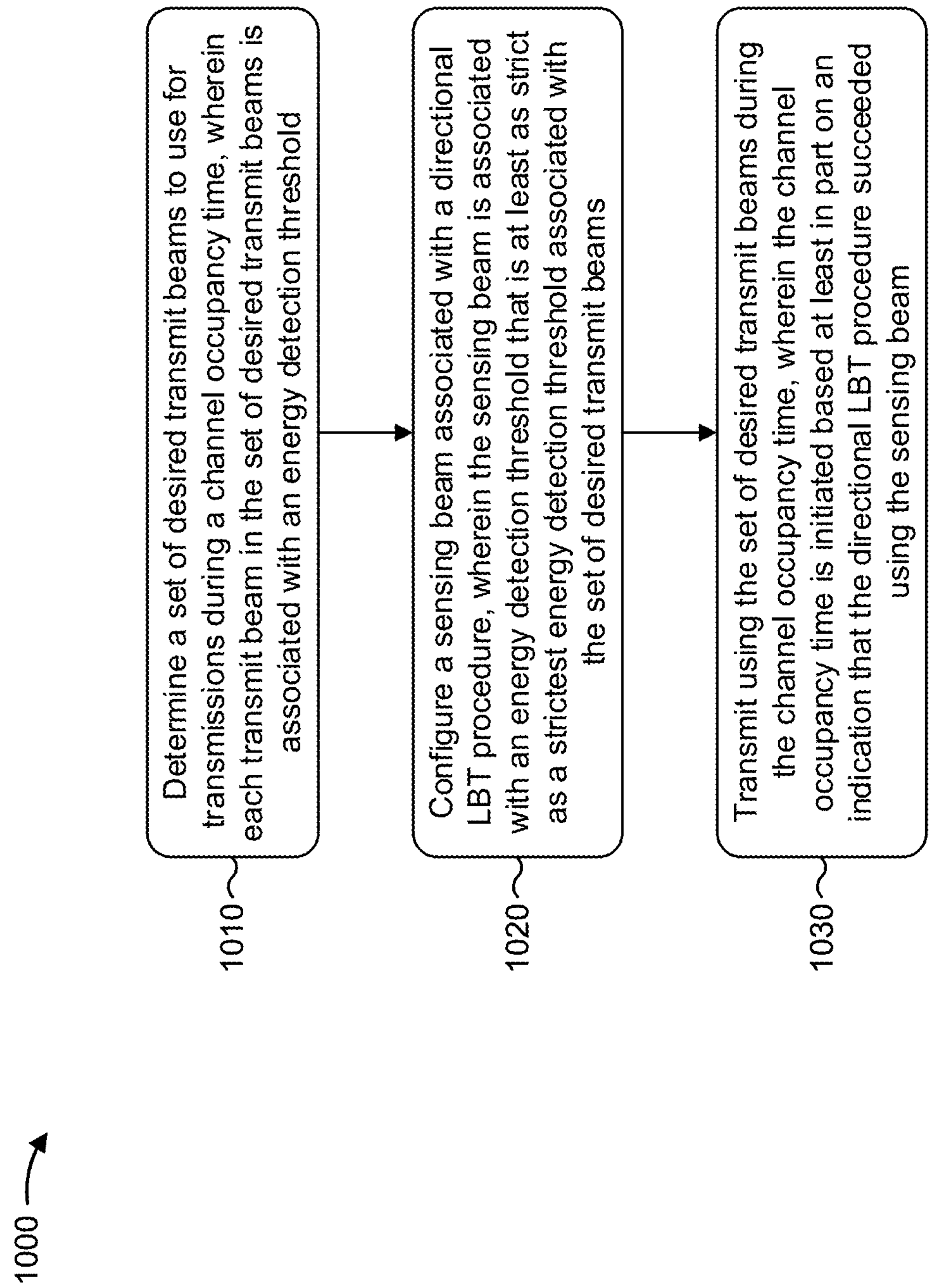
FIGS. 10-11 are diagrams illustrating example processes associated with eligible transmission beams based on a directional LBT procedure, in accordance with the present disclosure.

FIG. 10 is a diagram illustrating an example process 1000 performed, for example, by a transmitter node, in accordance with the present disclosure. Example process 1000 is an example where the transmitter node (e.g., base station 110, UE 120, and/or another suitable wireless device) performs operations associated with eligible transmission beams based on a directional LBT.

As shown in FIG. 10, in some aspects, process 1000 may include determining a set of desired transmit beams to use for transmissions during a COT, wherein each transmit beam in the set of desired transmit beams is associated with an EDT (block 1010). For example, the transmitter node (e.g., using determination component 1208, depicted in FIG. 12) may determine a set of desired transmit beams to use for transmissions during a COT, wherein each transmit beam in the set of desired transmit beams is associated with an EDT, as described above.

As further shown in FIG. 10, in some aspects, process 1000 may include configuring a sensing beam associated with a directional LBT procedure, wherein the sensing beam is associated with an EDT that is at least as strict as a strictest EDT associated with the set of desired transmit beams (block 1020). For example, the transmitter node (e.g., using LBT component 1210, depicted in FIG. 12) may configure a sensing beam associated with a directional LBT procedure, wherein the sensing beam is associated with an EDT that is at least as strict as a strictest EDT associated with the set of desired transmit beams, as described above.

As further shown in FIG. 10, in some aspects, process 1000 may include transmitting using the set of desired transmit beams during the COT, wherein the COT is initiated based at least in part on an indication that the directional LBT procedure succeeded using the sensing beam (block 1030). For example, the transmitter node (e.g., using transmission component 1204, depicted in FIG. 12) may transmit using the set of desired transmit beams during the COT, wherein the COT is initiated based at least in part on an indication that the directional LBT procedure succeeded using the sensing beam, as described above.

Process 1000 may include additional aspects, such as any single aspect or any combination of aspects described below and/or in connection with one or more other processes described elsewhere herein.

In a first aspect, the EDT associated with each transmit beam in the set of desired transmit beams is based at least in part on an EIRP and an operating bandwidth associated with the respective transmit beam.

In a second aspect, alone or in combination with the first aspect, the sensing beam is configured to cover the set of desired transmit beams.

In a third aspect, alone or in combination with one or more of the first and second aspects, the sensing beam is further configured to cover one or more receive beams to use for reception during the COT.

In a fourth aspect, alone or in combination with one or more of the first through third aspects, the set of desired transmit beams and the one or more receive beams covered by the sensing beam are associated with an initiator node performing the directional LBT procedure to initiate the COT.

In a fifth aspect, alone or in combination with one or more of the first through fourth aspects, the EDT associated with the sensing beam is determined independent of the one or more receive beams.

In a sixth aspect, alone or in combination with one or more of the first through fifth aspects, the EDT associated with the sensing beam is based at least in part on a tolerable interference level on the one or more receive beams.

In a seventh aspect, alone or in combination with one or more of the first through sixth aspects, the tolerable interference level on the one or more receive beams is signaled to an initiator node performing the directional LBT procedure to initiate the COT.

In an eighth aspect, alone or in combination with one or more of the first through seventh aspects, the sensing beam covers one or more transmit beams that are configured to carry a reference signal that derives a QCL relationship from a reference signal transmitted on the sensing beam.

In a ninth aspect, alone or in combination with one or more of the first through eighth aspects, the sensing beam is configured at a receiver node, and the sensing beam covers one or more transmit beams at the transmitter node that form a beam pair with the sensing beam at the receiver node.

In a tenth aspect, alone or in combination with one or more of the first through ninth aspects, the sensing beam is configured at a receiver node, and the sensing beam covers one or more transmit beams at the transmitter node that derive a QCL relationship from a transmit beam that forms a beam pair with the sensing beam at the receiver node.

In an eleventh aspect, alone or in combination with one or more of the first through tenth aspects, process 1000 includes attempting the directional LBT procedure using the sensing beam, and initiating the COT based at least in part on the indication that the directional LBT procedure succeeded using the sensing beam.

In a twelfth aspect, alone or in combination with one or more of the first through eleventh aspects, process 1000 includes transmitting, to a receiver node, control signaling configuring the receiver node to attempt the directional LBT procedure using the sensing beam, and receiving, from the receiver node, the indication that the directional LBT procedure succeeded using the sensing beam.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
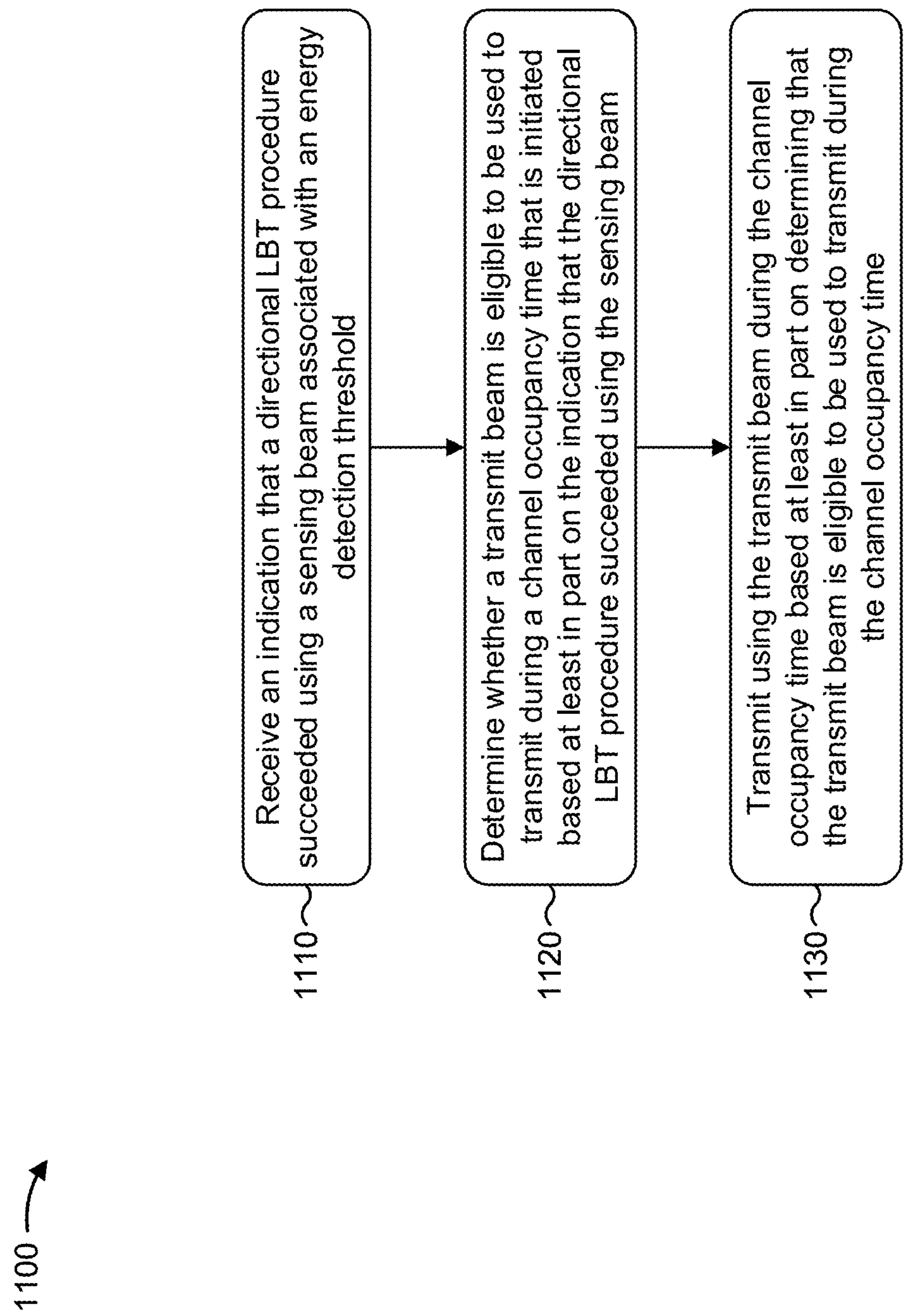

FIG. 11 is a diagram illustrating an example process 1100 performed, for example, by a transmitter node, in accordance with the present disclosure. Example process 1100 is an example where the transmitter node (e.g., base station 110, UE 120, and/or another suitable wireless device) performs operations associated with eligible transmission beams based on a directional LBT.

As shown in FIG. 11, in some aspects, process 1100 may include receiving an indication that a directional LBT procedure succeeded using a sensing beam associated with an EDT (block 1110). For example, the transmitter node (e.g., using reception component 1202 and/or LBT component 1210, depicted in FIG. 12) may receive an indication that a directional LBT procedure succeeded using a sensing beam associated with an EDT, as described above.

As further shown in FIG. 11, in some aspects, process 1100 may include determining whether a transmit beam is eligible to be used to transmit during a COT that is initiated based at least in part on the indication that the directional LBT procedure succeeded using the sensing beam (block 1120). For example, the transmitter node (e.g., using determination component 1208, depicted in FIG. 12) may determine whether a transmit beam is eligible to be used to transmit during a COT that is initiated based at least in part on the indication that the directional LBT procedure succeeded using the sensing beam, as described above.

As further shown in FIG. 11, in some aspects, process 1100 may include transmitting using the transmit beam during the COT based at least in part on determining that the transmit beam is eligible to be used to transmit during the COT (block 1130). For example, the transmitter node (e.g., using transmission component 1204, depicted in FIG. 12) may transmit using the transmit beam during the COT based at least in part on determining that the transmit beam is eligible to be used to transmit during the COT, as described above.

Process 1100 may include additional aspects, such as any single aspect or any combination of aspects described below and/or in connection with one or more other processes described elsewhere herein.

In a first aspect, process 1100 includes determining an EDT associated with the transmit beam based at least in part on an EIRP associated with the transmit beam and an operating bandwidth associated with the transmit beam.

In a second aspect, alone or in combination with the first aspect, the transmit beam is eligible to be used to transmit during the COT based at least in part on determining that the transmit beam is covered by the sensing beam and that the EDT associated with the transmit beam is not stricter than the EDT associated with the sensing beam.

In a third aspect, alone or in combination with one or more of the first and second aspects, a set of transmit beams that are eligible to be used to transmit during the COT excludes any beams that are not covered by the sensing beam or associated with an EDT that is stricter than the EDT associated with the sensing beam.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
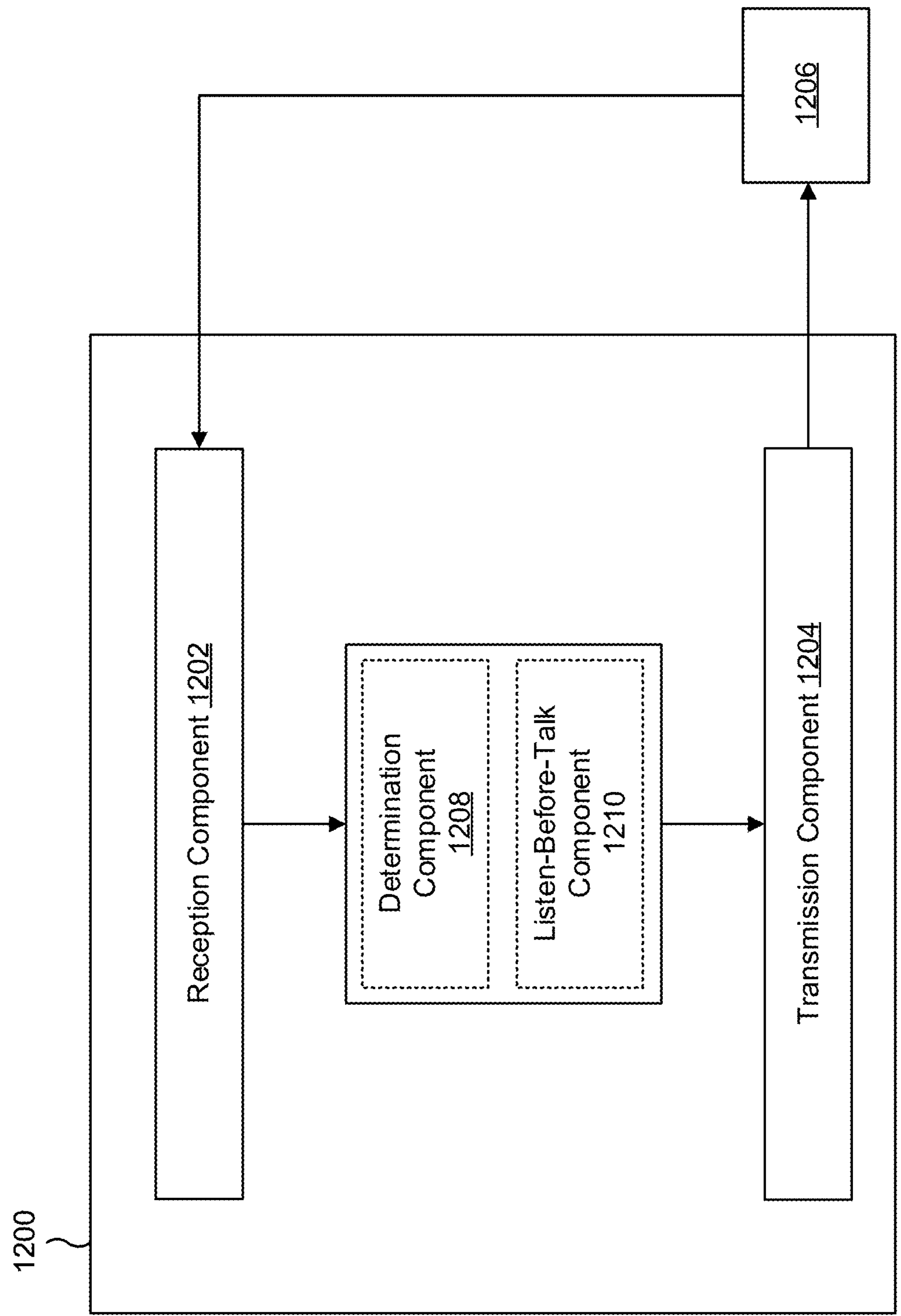
FIG. 12 is a block diagram of an example apparatus for wireless communication, in accordance with the present disclosure.

FIG. 12 is a block diagram of an example apparatus 1200 for wireless communication. The apparatus 1200 may be a transmitter node, or a transmitter node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a receiver node, a UE, a base station, or another wireless communication device) using the reception component 1202 and the transmission component 1204. As further shown, the apparatus 1200 may include one or more of a determination component 1208 or an LBT component 1210, among other examples.

In some aspects, the apparatus 1200 may be configured to perform one or more operations described herein in connection with FIGS. 4-9. Additionally, or alternatively, the apparatus 1200 may be configured to perform one or more processes described herein, such as process 1000 of FIG. 10, process 1100 of FIG. 11, or a combination thereof. In some aspects, the apparatus 1200 and/or one or more components shown in FIG. 12 may include one or more components of the transmitter node described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the transmitter node described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the transmitter node described above in connection with FIG. 2. In some aspects, the transmission component 1204 may be co-located with the reception component 1202 in a transceiver.

The determination component 1208 may determine a set of desired transmit beams to use for transmissions during a COT, wherein each transmit beam in the set of desired transmit beams is associated with an EDT. The LBT component 1210 may configure a sensing beam associated with a directional LBT procedure, wherein the sensing beam is associated with an EDT that is at least as strict as a strictest EDT associated with the set of desired transmit beams. The transmission component 1204 may transmit using the set of desired transmit beams during the COT, wherein the COT is initiated based at least in part on an indication that the directional LBT procedure succeeded using the sensing beam.

The LBT component 1210 may attempt the directional LBT procedure using the sensing beam. The LBT component 1210 may initiate the COT based at least in part on the indication that the directional LBT procedure succeeded using the sensing beam.

The transmission component 1204 may transmit, to a receiver node, control signaling configuring the receiver node to attempt the directional LBT procedure using the sensing beam. The reception component 1202 may receive, from the receiver node, the indication that the directional LBT procedure succeeded using the sensing beam.

The reception component 1202 and/or the LBT component 1210 may receive an indication that a directional LBT procedure succeeded using a sensing beam associated with an EDT. The determination component 1208 may determine whether a transmit beam is eligible to be used to transmit during a COT that is initiated based at least in part on the indication that the directional LBT procedure succeeded using the sensing beam. The transmission component 1204 may transmit using the transmit beam during the COT based at least in part on determining that the transmit beam is eligible to be used to transmit during the COT.

The determination component 1208 may determine an EDT associated with the transmit beam based at least in part on an EIRP associated with the transmit beam and an operating bandwidth associated with the transmit beam.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a transmitter node, comprising: determining a set of desired transmit beams to use for transmissions during a COT, wherein each transmit beam in the set of desired transmit beams is associated with an EDT; configuring a sensing beam associated with a directional LBT procedure, wherein the sensing beam is associated with an EDT that is at least as strict as a strictest EDT associated with the set of desired transmit beams; and transmitting using the set of desired transmit beams during the COT, wherein the COT is initiated based at least in part on an indication that the directional LBT procedure succeeded using the sensing beam.

Aspect 2: The method of Aspect 1, wherein the EDT associated with each transmit beam in the set of desired transmit beams is based at least in part on an EIRP and an operating bandwidth associated with the respective transmit beam.

Aspect 3: The method of any of Aspects 1-2, wherein the sensing beam is configured to cover the set of desired transmit beams.

Aspect 4: The method of Aspect 3, wherein the sensing beam is further configured to cover one or more receive beams to use for reception during the COT.

Aspect 5: The method of Aspect 4, wherein the set of desired transmit beams and the one or more receive beams covered by the sensing beam are associated with an initiator node performing the directional LBT procedure to initiate the COT.

Aspect 6: The method of any of Aspects 4-5, wherein the EDT associated with the sensing beam is determined independent of the one or more receive beams.

Aspect 7: The method of any of Aspects 4-5, wherein the EDT associated with the sensing beam is based at least in part on a tolerable interference level on the one or more receive beams.

Aspect 8: The method of Aspect 7, wherein the tolerable interference level on the one or more receive beams is signaled to an initiator node performing the directional LBT procedure to initiate the COT.

Aspect 9: The method of any of Aspects 1-8, wherein the sensing beam covers one or more transmit beams that are configured to carry a reference signal that derives a QCL relationship from a reference signal transmitted on the sensing beam.

Aspect 10: The method of any of Aspects 1-9, wherein the sensing beam is configured at a receiver node, and wherein the sensing beam covers one or more transmit beams at the transmitter node that form a beam pair with the sensing beam at the receiver node.

Aspect 11: The method of any of Aspects 1-10, wherein the sensing beam is configured at a receiver node, and wherein the sensing beam covers one or more transmit beams at the transmitter node that derive a QCL relationship from a transmit beam that forms a beam pair with the sensing beam at the receiver node.

Aspect 12: The method of any of Aspects 1-11, further comprising: attempting the directional LBT procedure using the sensing beam; and initiating the COT based at least in part on the indication that the directional LBT procedure succeeded using the sensing beam.

Aspect 13: The method of any of Aspects 1-11, further comprising: transmitting, to a receiver node, control signaling configuring the receiver node to attempt the directional LBT procedure using the sensing beam; and receiving, from the receiver node, the indication that the directional LBT procedure succeeded using the sensing beam.

Aspect 14: A method of wireless communication performed by a transmitter node, comprising: receiving an indication that a directional LBT procedure succeeded using a sensing beam associated with an EDT; determining whether a transmit beam is eligible to be used to transmit during a COT that is initiated based at least in part on the indication that the directional LBT procedure succeeded using the sensing beam; and transmitting using the transmit beam during the COT based at least in part on determining that the transmit beam is eligible to be used to transmit during the COT.

Aspect 15: The method of Aspect 14, further comprising: determining an EDT associated with the transmit beam based at least in part on an EIRP associated with the transmit beam and an operating bandwidth associated with the transmit beam.

Aspect 16: The method of Aspect 15, wherein the transmit beam is eligible to be used to transmit during the COT based at least in part on determining that the transmit beam is covered by the sensing beam and that the EDT associated with the transmit beam is not stricter than the EDT associated with the sensing beam.

Aspect 17: The method of any of Aspects 15-16, wherein a set of transmit beams that are eligible to be used to transmit during the COT excludes any beams that are not covered by the sensing beam or associated with an EDT that is stricter than the EDT associated with the sensing beam.

Aspect 18: An apparatus for wireless communication at a device, comprising a processor; memory coupled with the processor; and instructions stored in the memory and executable by the processor to cause the apparatus to perform the method of any of Aspects 1-13.

Aspect 19: A device for wireless communication, comprising a memory and one or more processors coupled to the memory, the memory and the one or more processors configured to perform the method of any of Aspects 1-13.

Aspect 20: An apparatus for wireless communication, comprising at least one means for performing the method of any of Aspects 1-13.

Aspect 21: A non-transitory computer-readable medium storing code for wireless communication, the code comprising instructions executable by a processor to perform the method of any of Aspects 1-13.

Aspect 22: A non-transitory computer-readable medium storing a set of instructions for wireless communication, the set of instructions comprising one or more instructions that, when executed by one or more processors of a device, cause the device to perform the method of any of Aspects 1-13.

Aspect 23: An apparatus for wireless communication at a device, comprising a processor; memory coupled with the processor; and instructions stored in the memory and executable by the processor to cause the apparatus to perform the method of any of Aspects 14-17.

Aspect 24: A device for wireless communication, comprising a memory and one or more processors coupled to the memory, the memory and the one or more processors configured to perform the method of any of Aspects 14-17.

Aspect 25: An apparatus for wireless communication, comprising at least one means for performing the method of any of Aspects 14-17.

Aspect 26: A non-transitory computer-readable medium storing code for wireless communication, the code comprising instructions executable by a processor to perform the method of any of Aspects 14-17.

Aspect 27: A non-transitory computer-readable medium storing a set of instructions for wireless communication, the set of instructions comprising one or more instructions that, when executed by one or more processors of a device, cause the device to perform the method of any of Aspects 14-17.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitter node for wireless communication, comprising:

a memory; and one or more processors, coupled to the memory, configured to cause the transmitter node to:

determine one or more transmit beams to use for transmissions during a channel occupancy time (COT), wherein a transmit beam, of the one or more transmit beams, is associated with a first energy detection threshold (EDT);

configure a sensing beam associated with a directional listen-before-talk (LBT) procedure, wherein the sensing beam covers the one or more transmit beams, and wherein the sensing beam is associated with a second EDT that is based at least in part on an effective isotropic radiated power (EIRP) associated with the transmissions during the COT; and transmit using the one or more transmit beams during the COT, wherein the COT is initiated based at least in part on a success of the directional LBT procedure using the sensing beam.

2. The transmitter node of claim 1, wherein the first EDT is based at least in part on an effective isotropic radiated power associated with the transmit beam and an operating bandwidth associated with the transmit beam.

3. The transmitter node of claim 1, wherein the sensing beam is further configured to cover one or more receive beams to use for reception during the COT.

4. The transmitter node of claim 3, wherein the one or more transmit beams and the one or more receive beams covered by the sensing beam are associated with an initiator node configured to perform the directional LBT procedure to initiate the COT.

5. The transmitter node of claim 3, wherein the second EDT is determined independent of the one or more receive beams.

6. The transmitter node of claim 3, wherein the second EDT is based at least in part on a tolerable interference level on the one or more receive beams.

7. The transmitter node of claim 6, wherein the tolerable interference level on the one or more receive beams is signaled to an initiator node performing the directional LBT procedure to initiate the COT.

8. The transmitter node of claim 1, wherein the sensing beam covers one or more transmit beams that are configured to carry a reference signal that derives a quasi co-location relationship from a reference signal transmitted on the sensing beam.

9. The transmitter node of claim 1, wherein the sensing beam is configured at a receiver node, and wherein the one or more transmit beams comprise a set of transmit beams at the transmitter node that form a beam pair with the sensing beam at the receiver node.

10. The transmitter node of claim 1, wherein the sensing beam is configured at a receiver node, wherein the one or more transmit beams comprise a set of transmit beams at the transmitter node that derive a quasi co-location relationship from one or more of the transmit beam a different transmit beam of the set of transmit beams, and wherein one or more of the transmit beam or the different transmit beam form a beam pair with the sensing beam at the receiver node.

11. The transmitter node of claim 1, wherein the one or more processors are further configured to cause the transmitter node to:

attempt the directional LBT procedure using the sensing beam; and initiate the COT based at least in part on the success of the directional LBT procedure using the sensing beam.

12. The transmitter node of claim 1, wherein the one or more processors are further configured to cause the transmitter node to:

transmit, to a receiver node, control signaling configuring the receiver node to attempt the directional LBT procedure using the sensing beam; and receive, from the receiver node, an indication that the directional LBT procedure succeeded using the sensing beam.

13. The transmitter node of claim 1, wherein the LBT procedure comprises a channel access procedure for shared or unlicensed frequency band channel access.

14. A method of wireless communication performed by a transmitter node, comprising:

determining one or more transmit beams to use for transmissions during a channel occupancy time (COT), wherein a transmit beam, of the one or more transmit beams, is associated with a first energy detection threshold (EDT);

configuring a sensing beam associated with a directional listen-before-talk (LBT) procedure, wherein the sensing beam covers the one or more transmit beams, and wherein the sensing beam is associated with a second EDT that is based at least in part on an equivalent isotropic radiated power (EIRP) associated with the transmissions during the COT; and transmitting using the one or more transmit beams during the COT, wherein the COT is initiated based at least in part on a success of the directional LBT procedure using the sensing beam.

15. The method of claim 14, wherein the first EDT is based at least in part on an effective isotropic radiated power associated with the transmit beam and an operating bandwidth associated with the transmit beam.

16. The method of claim 14, wherein the sensing beam is further configured to cover one or more receive beams to use for reception during the COT.

17. The method of claim 16, wherein the one or more transmit beams and the one or more receive beams covered by the sensing beam are associated with an initiator node configured to perform the directional LBT procedure to initiate the COT.

18. The method of claim 16, wherein the second EDT is determined independent of the one or more receive beams.

19. The method of claim 16, wherein the second EDT is based at least in part on a tolerable interference level on the one or more receive beams.

20. The method of claim 14, wherein the sensing beam is configured at a receiver node, and wherein the sensing beam covers one or more transmit beams at the transmitter node that form a beam pair with the sensing beam at the receiver node.

21. The method of claim 14, wherein the sensing beam is configured at a receiver node, wherein the one or more transmit beams comprise a set of transmit beams at the transmitter node that derive a quasi co-location relationship from one or more of the transmit beam or a different transmit beam of the set of transmit beams, and wherein one or more of the transmit beam or the different transmit beam form a beam pair with the sensing beam at the receiver node.

22. The method of claim 14, further comprising:

attempting the directional LBT procedure using the sensing beam; and initiating the COT based at least in part on the success of the directional LBT procedure using the sensing beam.

23. The method of claim 14, further comprising:

transmitting, to a receiver node, control signaling configuring the receiver node to attempt the directional LBT procedure using the sensing beam; and receiving, from the receiver node, an indication that the directional LBT procedure succeeded using the sensing beam.

24. The method of claim 14, wherein the LBT procedure comprises a channel access procedure for shared or unlicensed frequency band channel access.

25. A transmitter node for wireless communication, comprising:

a memory; and one or more processors, coupled to the memory, configured to cause the transmitter node to:

receive an indication that a directional listen-before-talk (LBT) procedure succeeded using a sensing beam associated with an energy detection threshold (EDT), wherein the EDT is based at least in part on an effective isotropic radiated power (EIRP) associated with transmissions during a channel occupancy time (COT);

determine a different EDT associated with a transmit beam based at least in part on a different EIRP and an operating bandwidth associated with the transmit beam;

determine, based at least in part on the different EIRP and the operating bandwidth associated with the transmit beam that the transmit beam is eligible to be used to transmit during the COT that is initiated based at least in part on the indication that the directional LBT procedure succeeded using the sensing beam; and transmit using the transmit beam during the COT based at least in part on determining that the transmit beam is eligible to be used to transmit during the COT.

26. The transmitter node of claim 25, wherein the transmit beam is eligible to be used to transmit during the COT based at least in part on a determination that the transmit beam is covered by the sensing beam and that the different EDT is not stricter than the EDT.

27. The transmitter node of claim 25, wherein a set of transmit beams that are eligible to be used to transmit during the COT excludes any beams that are not covered by the sensing beam or associated with a different EDT that is stricter than the EDT.

28. A method of wireless communication performed by a transmitter node, comprising:

receiving an indication that a directional listen-before-talk (LBT) procedure succeeded using a sensing beam associated with an energy detection threshold (EDT), wherein the EDT is based at least in part on an effective isotropic radiated power (EIRP) associated with transmissions during a channel occupancy time (COT);

determining a different EDT associated with a transmit beam based at least in part on a different EIRP and an operating bandwidth associated with the transmit beam;

determining, based at least in part on the different EIRP and the operating bandwidth associated with the transmit beam, that the transmit beam is eligible to be used to transmit during the COT that is initiated based at least in part on the indication that the directional LBT procedure succeeded using the sensing beam; and transmitting using the transmit beam during the COT based at least in part on determining that the transmit beam is eligible to be used to transmit during the COT.

29. The method of claim 28, wherein the transmit beam is eligible to be used to transmit during the COT based at least in part on determining that the transmit beam is covered by the sensing beam and that the different EDT is not stricter than the EDT.

30. The method of claim 28, wherein a set of transmit beams that are eligible to be used to transmit during the COT excludes any beams that are not covered by the sensing beam or associated with a different EDT that is stricter than the EDT.

* * * * *